(12) United States Patent
BenHanokh et al.

(10) Patent No.: US 9,547,459 B1
(45) Date of Patent: Jan. 17, 2017

(54) TECHNIQUES FOR DATA RELOCATION BASED ON ACCESS PATTERNS

(71) Applicant: EMC IP Holding Company LLC, Hopkinton, MA (US)

(72) Inventors: Gabriel BenHanokh, Tel-Aviv (IL); Assaf Natanzon, Tel-Aviv (IL); Arieh Don, Newton, MA (US); Eitan Ben-Amos, Karkur (IL); Erez Sde-Or, Hamerk (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 329 days.

(21) Appl. No.: 13/928,907

(22) Filed: Jun. 27, 2013

(51) Int. Cl.
*G06F 12/00* (2006.01)
*G06F 3/06* (2006.01)

(52) U.S. Cl.
CPC .......... *G06F 3/0689* (2013.01); *G06F 3/0614* (2013.01); *G06F 3/0646* (2013.01)

(58) Field of Classification Search
CPC .................................. G06F 12/0246
USPC ............................. 711/103, 115
See application file for complete search history.

(56) References Cited

U.S. PATENT DOCUMENTS

| 6,061,274 | A | * | 5/2000 | Thibault et al. | ......... | 365/189.05 |
| 7,949,637 | B1 | * | 5/2011 | Burke | .......................... | 707/655 |
| 8,086,768 | B2 | * | 12/2011 | Watanabe | ............. | G06F 3/0611 |
| | | | | | | 710/36 |
| 2005/0144337 | A1 | * | 6/2005 | Kahle | ............................. | 710/22 |
| 2008/0126673 | A1 | * | 5/2008 | Kaneda | ................. | G06F 3/0605 |
| | | | | | | 711/103 |
| 2009/0070541 | A1 | | 3/2009 | Yochai | | |
| 2010/0241789 | A1 | * | 9/2010 | Chu et al. | ...................... | 711/103 |
| 2010/0262775 | A1 | * | 10/2010 | Ito et al. | ....................... | 711/114 |
| 2010/0293348 | A1 | * | 11/2010 | Ye et al. | ........................ | 711/157 |
| 2013/0080732 | A1 | * | 3/2013 | Nellans et al. | ............... | 711/206 |
| 2013/0138867 | A1 | * | 5/2013 | Craft et al. | ................... | 711/103 |

OTHER PUBLICATIONS

EMC Recoverpoint Family, "Cost-effective local and remote data protection and disaster recovery solution," Data Sheet, Apr. 2012, 5 Pages.

* cited by examiner

*Primary Examiner* — Midys Rojas
*Assistant Examiner* — Tasnima Matin
(74) *Attorney, Agent, or Firm* — Muirhead and Saturnelli, LLC

(57) ABSTRACT

Described are techniques for storing data. A data access pattern is identified for accessing a first set of data portions of a first logical device, wherein the data access pattern includes a time-ordered list of consecutively accessed logical addresses of the first logical device. The first set of data portions are arranged on a second logical device. The first set of data portions have corresponding logical addresses on the second logical device and such corresponding logical addresses have a consecutive sequential ordering based on the data access pattern. The first set of data portions are stored at physical device locations mapped to the corresponding logical addresses of the second logical device.

20 Claims, 19 Drawing Sheets

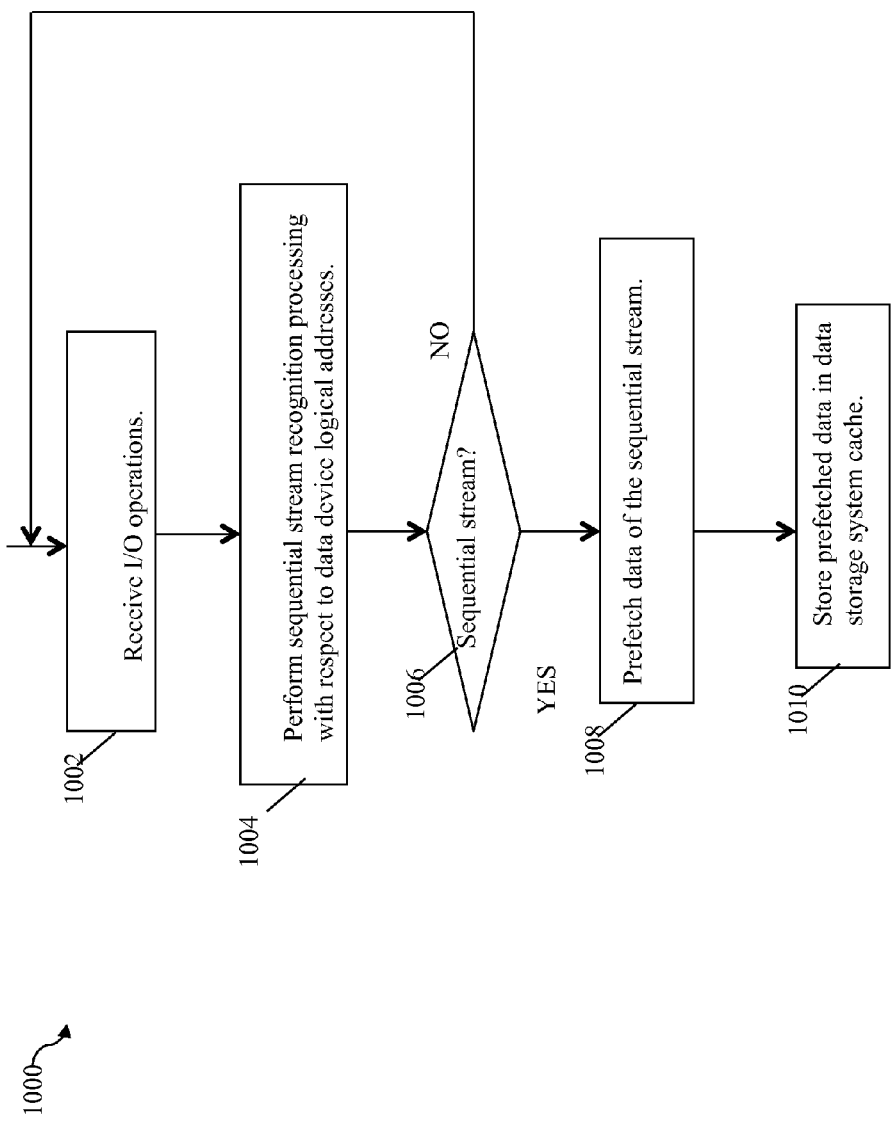

TECHNIQUES FOR DATA RELOCATION BASED ON ACCESS PATTERNS

BACKGROUND

Technical Field

This application generally relates to data storage systems, and more particularly to techniques for data relocation based on access patterns.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices and data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein.

SUMMARY OF THE INVENTION

In accordance with one aspect of the invention is a method of storing data comprising: identifying a data access pattern for accessing a first set of data portions of a first logical device, wherein the data access pattern includes a time-ordered list of consecutively accessed logical addresses of the first logical device; arranging the first set of data portions on a second logical device, wherein the first set of data portions have corresponding logical addresses on the second logical device and whereby such corresponding logical addresses have a consecutive sequential ordering based on the data access pattern; and storing the first set of data portions at physical device locations mapped to the corresponding logical addresses of the second logical device. The method may include receiving an I/O operation directed to a first logical address of the first logical device; determining a first physical storage location mapped to the first logical address of the first logical device by performing first processing comprising: mapping the first logical address of the first logical device to a second logical address of the second logical device; and mapping the second logical address of the second logical device to the first physical storage location. The method may include monitoring received data operations directed to the first logical device; recording in a log logical addresses of the first logical device accessed by said data operations; and analyzing the log to determine the data access pattern. The time-ordered list of consecutively accessed logical addresses may include a plurality of logical addresses forming the data access pattern and wherein the plurality of logical addresses may not identify a set of consecutive logical addresses of the first logical device. The data operation may include both read and write operations and an entry is made in the log for each of the data operations. The access pattern may include logical addresses of the first logical device accessed in connection with at least one read operation and at least one write operation. The physical device locations may be located on a set of physical devices configured as a RAID group providing mirroring of stored data without parity and without striping, whereby all data stored to the set of physical devices may be stored on two different physical devices of the set. The set of physical devices may include a first physical device and a second physical device, and wherein, for two data portions in the first set having consecutive logical addresses on the second logical device, the two data portions may be contiguously stored at consecutive physical locations of the first physical device and also stored at consecutive physical locations of the second physical device mirroring data stored on the first physical device. The method may include performing sequential stream recognition processing to recognize a sequential stream of read operations accessing consecutive physical locations of a physical device of the set; and responsive to recognizing a sequential stream of read operations, prefetching first data in accordance with the recognized sequential stream prior to said first data being requested in connection with a read operation. Code stored in a memory of the physical device may be executed and may perform the sequential stream recognition processing and the prefetching, and wherein the prefetching prefetches the first data and stores the first data in a cache of the physical device. The method may include performing sequential stream recognition processing to recognize a sequential stream of read operations accessing consecutive logical addresses of the second logical device; and responsive to recognizing a sequential stream of read operations, prefetching first data in accordance with the recognized sequential stream prior to said first data being requested in connection with a read operation. Code stored in a memory of a disk controller may be executed and may perform the sequential stream recognition processing and the prefetching, and wherein the prefetching prefetches the first data and stores the first data in a cache of a data storage system including the disk controller.

In accordance with another aspect of the invention is a computer readable medium comprising code stored thereon for storing data, the computer readable medium comprising code for: identifying a data access pattern for accessing a first set of data portions of a first logical device, wherein the data access pattern includes a time-ordered list of consecutively accessed logical addresses of the first logical device; arranging the first set of data portions on a second logical device, wherein the first set of data portions have corresponding logical addresses on the second logical device and whereby such corresponding logical addresses have a consecutive sequential ordering based on the data access pattern; and storing the first set of data portions at physical device locations mapped to the corresponding logical addresses of the second logical device. The computer readable medium may further comprise code for receiving an I/O operation directed to a first logical address of the first logical device; determining a first physical storage location mapped to the first logical address of the first logical device by performing first processing comprising: mapping the first logical address of the first logical device to a second logical address of the second logical device; and mapping the second logical address of the second logical device to the first physical storage location. The computer readable medium may comprise code for monitoring received data operations directed to the first logical device; recording in a log logical addresses of the first logical device accessed by said data operations; and analyzing the log to determine the data access pattern. The time-ordered list of consecutively accessed logical addresses may include a plurality of logical addresses forming the data access pattern and wherein the plurality of logical addresses may not identify a set of consecutive logical addresses of the first logical device. The data operations may include both read and write operations and an entry may be made in the log for each of the data operations. The data access pattern may include logical addresses of the first logical device accessed in connection with at least one read operation and at least one write operation. The physical device locations may be located on a set of physical devices configured as a RAID group providing mirroring of stored data without parity and without striping, whereby all data stored to the set of physical devices may be stored on two different physical devices of the set. The set of physical devices may include a first physical device and a second physical device, and wherein, for two data portions in the first set having consecutive logical addresses on the second logical device, the two data portions may be contiguously stored at consecutive physical locations of the first physical device and may also be stored at consecutive physical locations of the second physical device mirroring data stored on the first physical device. The computer readable medium may also include code for performing sequential stream recognition processing to recognize a sequential stream of read operations accessing consecutive physical locations of a physical device of the set; and responsive to recognizing a sequential stream of read operations, prefetching first data in accordance with the recognized sequential stream prior to said first data being requested in connection with a read operation, and wherein code stored in a memory of the physical device is executed and performs said sequential stream recognition processing and said prefetching, and wherein said prefetching prefetches said first data and stores the first data in a cache of the physical device.

In accordance with another aspect of the invention is a system comprising: a host that issues I/O operations; a data storage system including a plurality of physical devices, wherein the host issues the I/O operations to the data storage system, and wherein the data storage system includes a processor programmed to perform processing steps comprising: monitoring received I/O operations and identifying a data access pattern for accessing a first set of data portions of a first logical device, wherein the data access pattern includes a time-ordered list of consecutively accessed logical addresses of the first logical device; arranging the first set of data portions on a second logical device, wherein the first set of data portions have corresponding logical addresses on the second logical device and whereby such corresponding logical addresses have a consecutive sequential ordering based on the data access pattern; and storing the first set of data portions at physical device locations mapped to the corresponding logical addresses of the second logical device.

BRIEF DESCRIPTION OF THE DRAWINGS

Features and advantages of the present invention will become more apparent from the following detailed description of exemplary embodiments thereof taken in conjunction with the accompanying drawings in which:

FIGS. 10-12 are flowcharts of processing steps that may be performed in an embodiment in accordance with techniques herein.

DETAILED DESCRIPTION OF EMBODIMENT(S)

Figure 1:
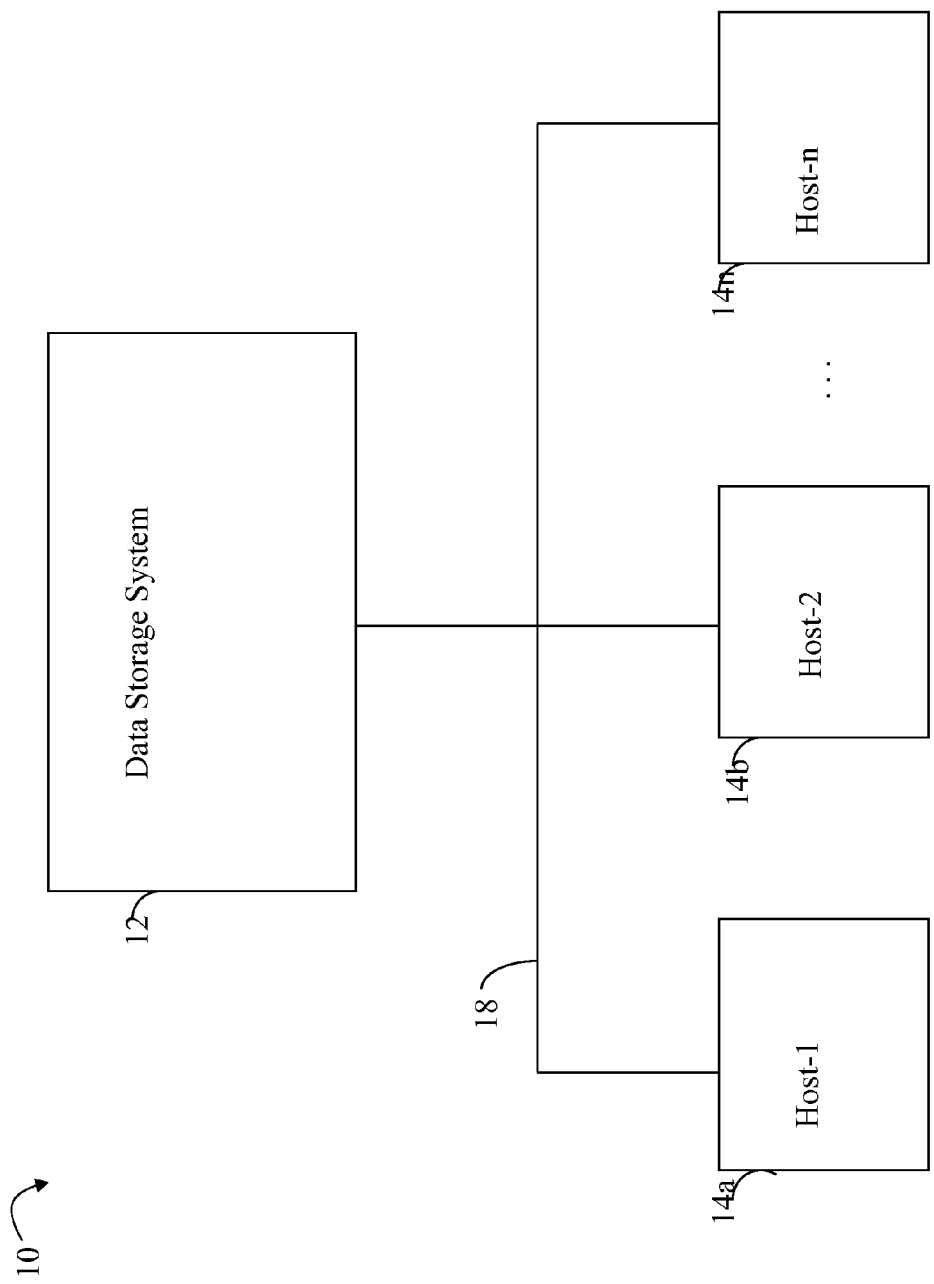
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, or iSCSI, Fibre Channel over Ethernet, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix™ data storage system, as well one or more other data storage systems as may vary with the embodiment.

Figure 2A:
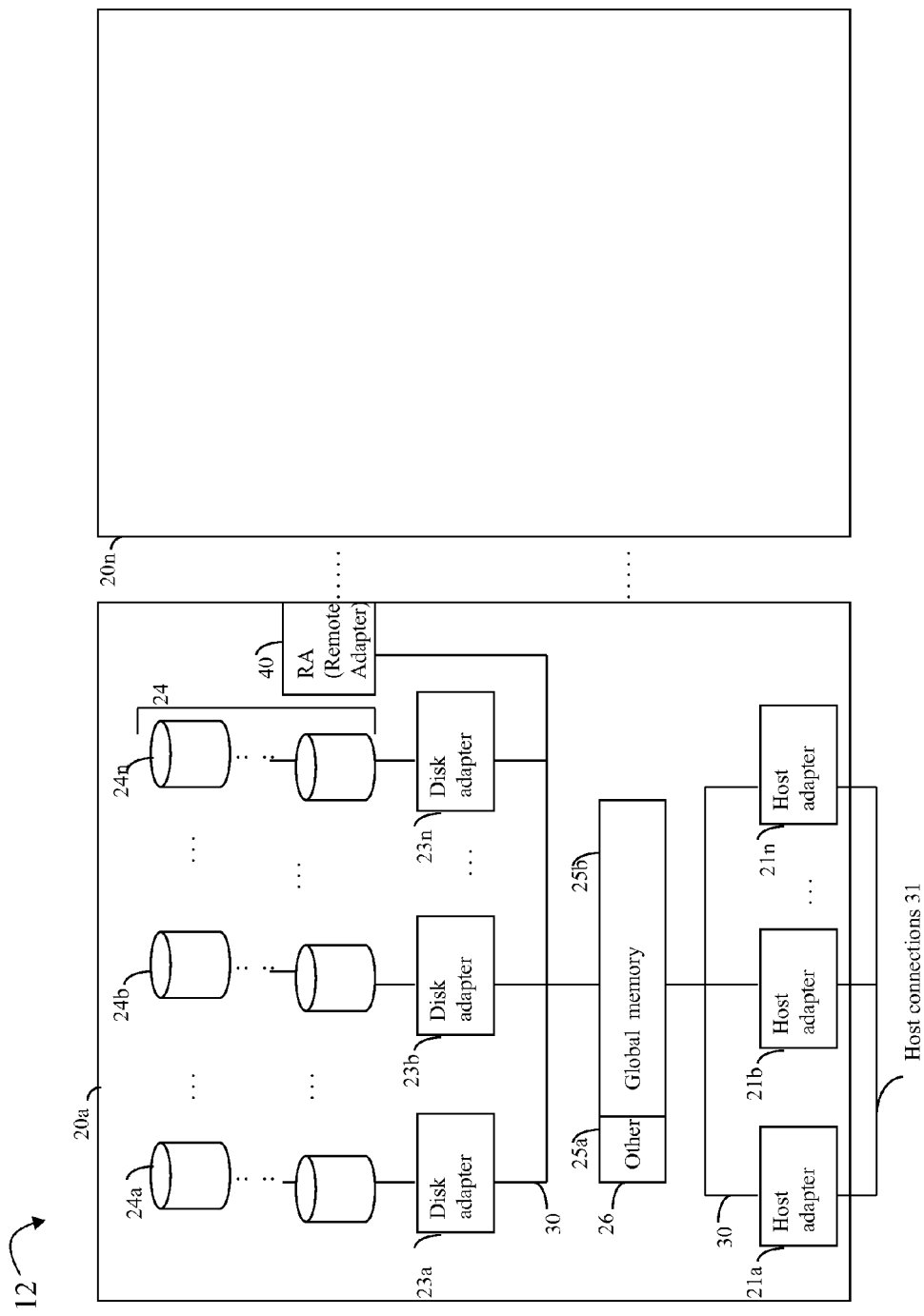
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA. It should be noted that the storage devices included in 24 may include one or more types of rotating disk drives, flash-based memory storage devices or other solid state devices (SSDs).

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host may also be referred to as front end components. A component of the data storage system which communicates with a front end component may be characterized as a backend component, such as a DA. In connection with data storage systems such as by EMC Corporation, various types of directors or adapters may be implemented as a processor, or, more generally, a component that includes the processor. Examples of directors are disk adapters (DAs), host adapters (HAs) and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units also referred to as LUNs (logical unit numbers). The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon. A LUN or logical unit number may be characterized as a disk array or data storage system reference to an amount of disk space that has been formatted and allocated for use to one or more hosts.

The DA performs I/O operations on a disk drive. Data residing on a LUN may be accessed by the DA following a data request in connection with I/O operations that other directors originate.

Figure 2B:
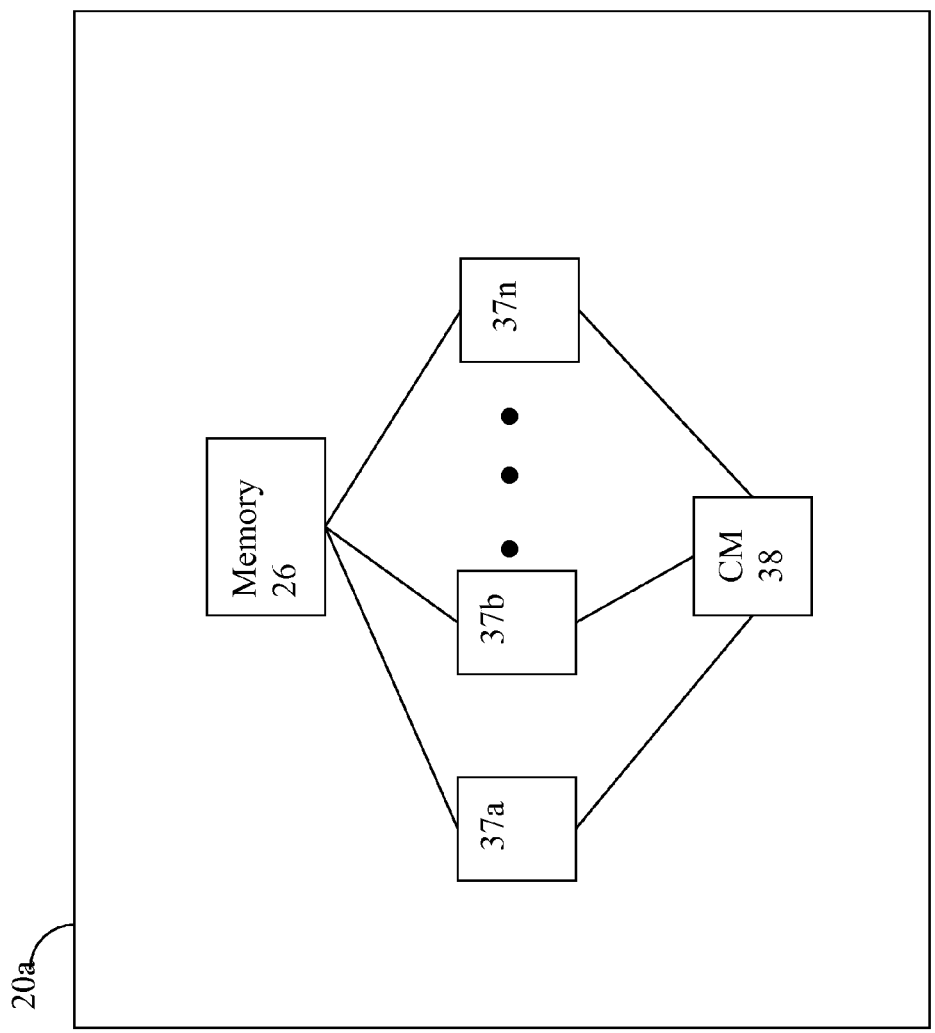
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different physical paths from the host to the data storage system. Described in the following paragraphs are techniques that may be used in connection with selecting a path over which to access data of a storage device when such data is accessible over multiple paths. A host may use such techniques in connection with path selection when communicating data operations, such as I/O operations, to the data storage system.

Figure 3:
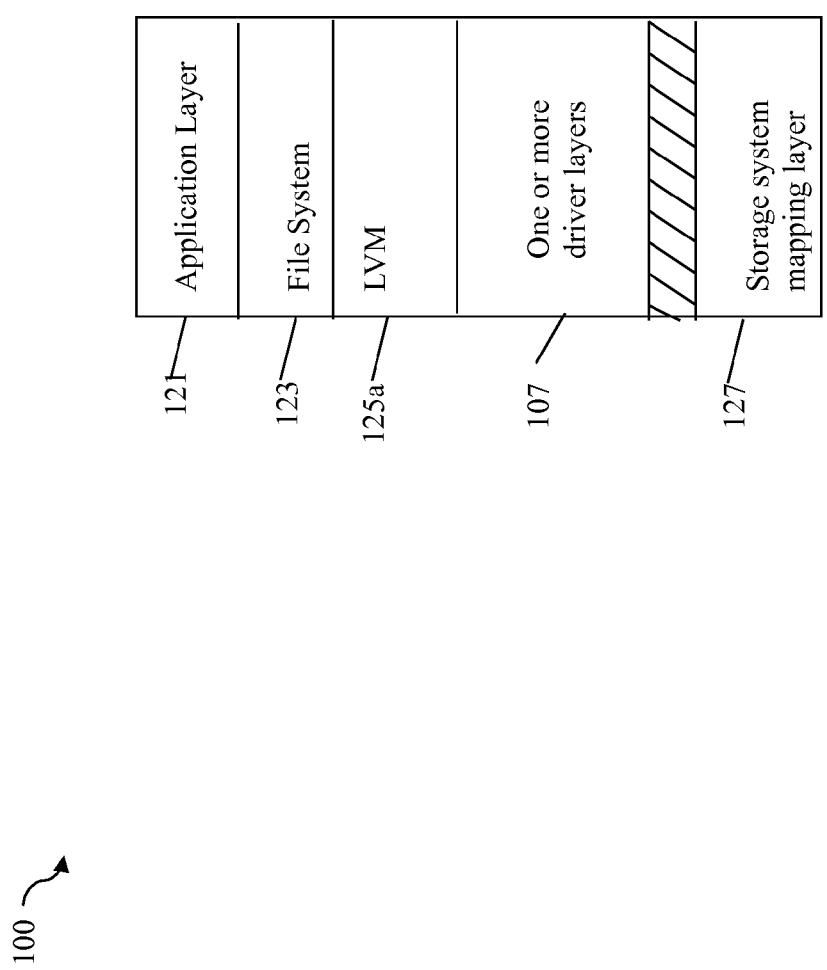
FIG. 3 is an example of different layers that may be included in a host and data storage system in an embodiment in accordance with techniques herein.

Referring to FIG. 3, shown is a representation of a number of mapping layers that may be included in a system, such as a host as described above in combination with a data storage system. The various software layers of 100 may generally form layers included in the runtime I/O stack, such as when an I/O request is issued by an application on a host to a data storage system. The system includes an application layer 121 which includes application programs executing on the host computer 14a-14n of FIG. 1. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be one or more driver layers 107. The one or more driver layers may include, for example, a SCSI driver and one or more hardware (HW) drivers, as well as other drivers that may vary with embodiment to facilitate communications between the host and data storage system. More generally, one or more layers between the application layer 121 and the one or more driver layers 107 may provide for mapping a LUN (such as used in connection with block-based storage) presented by the data storage system to the host to another logical data storage entity, such as a file, that may be used by the application layer 121.

In some embodiments, the data storage system 12 may be an intelligent data storage system having its own mapping layer 127 such that the LUN, or more generally logical device, that is known or exposed to the host may not directly correspond to a physical device such as a disk drive. In such embodiments, the LUN as referenced by the host in connection with the I/O operation may be further mapped by the data storage system using its mapping layer 127. For example, a LUN specified by the host in connection with I/O operations may be mapped, through one or more mapping layers by the data storage system, to one or more physical drives, multiple LUNs may be located on a same physical device, multiple physical drives, and the like. In other embodiments, the data storage system may not include such a mapping layer 127.

The drivers 107, as well as other components illustrated in FIG. 3, may execute in kernel mode or other privileged execution mode. In contrast, an application such as represented by application layer 121 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, and the like. Additionally, the host may provide a virtualized environment and may execute, for example, VMware ESX or VMware ESXi software providing bare metal embedded hypervisors.

In operation, an application executing at application layer 121 may issue one or more I/O operations (e.g., read and write operations) to logical volumes (implemented by the LVM 125a) or files (implemented using the file system 123) whereby such I/O operations may be then mapped to data operations directed to LUNs, or more generally logical devices, of the data storage system. Such I/O operations from the application layer 121 may be directed to the one or more drivers 107 after passing through any intervening layers such as layers 123 and 125a.

In connection with an embodiment in accordance with techniques herein, communications between an initiator port of the host and a target port of a data storage system may include those related to I/O operations and other non-I/O commands such as related to host control operations. I/O operations may include, for example, read and write operations.

An application may execute on a host where the application performs I/O (input/output) operations. A data storage system may perform one or more optimizations with a goal to increase overall system performance and reduce response time in connection with servicing I/O operations. As described below in more detail, one such optimization includes pattern recognition processing whereby I/O operation requests made by the host may be monitored in an attempt to detect an access pattern of a number of logical addresses of a logical device presented to the host. If such a pattern is detected, the data storage system may attempt to predict future data accesses based on the detected prior pattern. For a detected pattern including only read requests, the data storage system may also prefetch data which is predicted or expected to be accessed next in the pattern prior to receiving an actual read request for such data. In this manner, the prefetched data may be retrieved from physical storage and stored in cache prior to being requested. Assuming the prediction is correct, a request is then received for the prefetched data resulting in a cache hit whereby the data stored in cache may then be returned to the host using the cached data. Upon receiving the read request for the prefetched data, returning requested data from cache typically requires less time than the amount of time needed to obtain the requested data from physical storage.

Figure 4A:
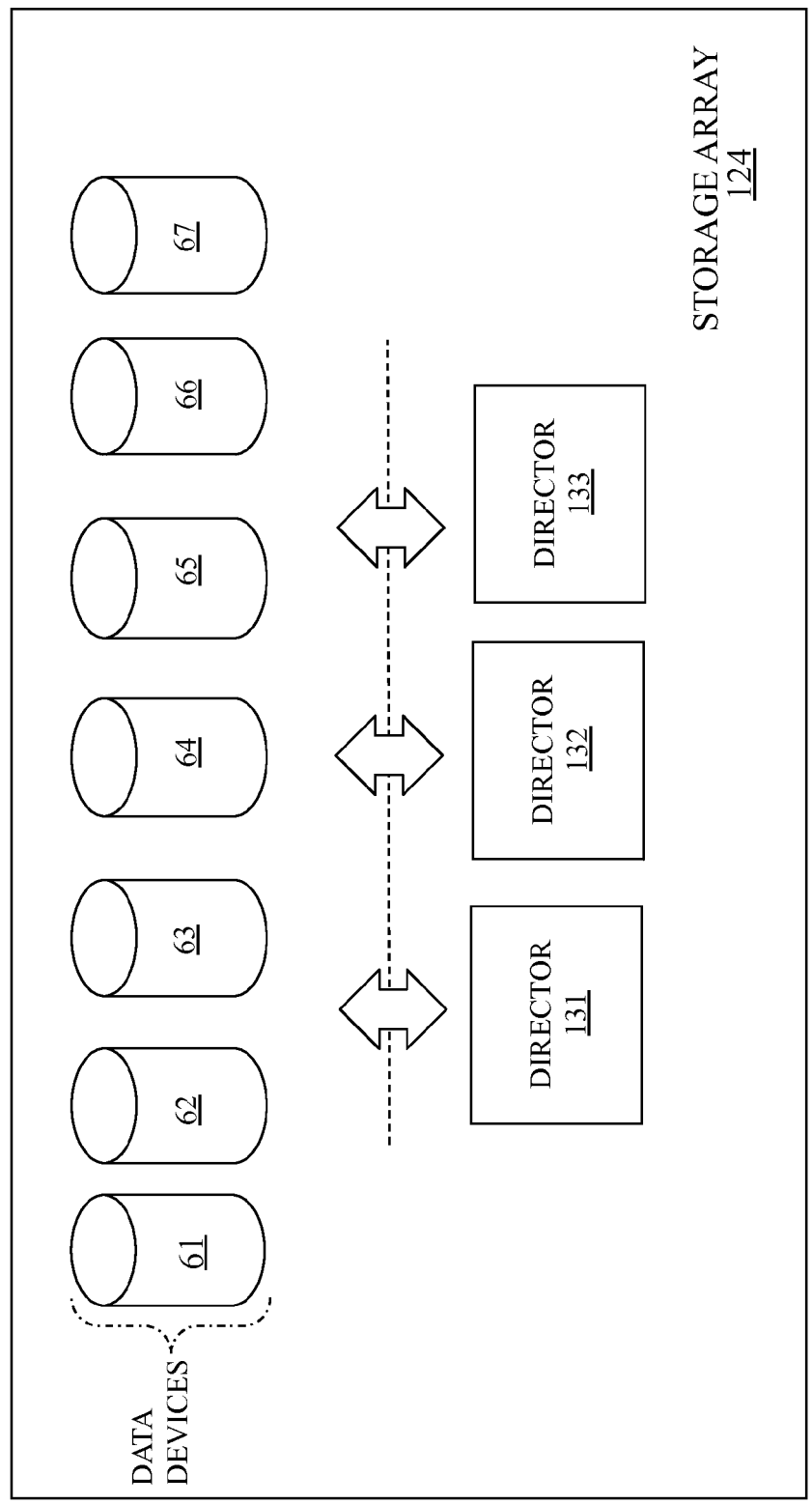
FIGS. 4A and 4B are examples of logical devices that may be included in a data storage system in an embodiment in accordance with techniques herein.

Referring to FIG. 4A, shown is a schematic diagram of the storage array 124 as including a plurality of data devices 61-67 communicating with directors 131-133. The data devices 61-67 may be implemented as logical devices like standard logical devices (also referred to as thick devices) provided in a Symmetrix® VMAX® data storage system produced by EMC Corporation of Hopkinton, Mass., for example. The directors 131-133 may be, for example, FAs or front end directors receiving I/O operations from host. In some embodiments, the data devices 61-67 may or may not be directly useable (visible) to hosts coupled to the storage array 124. Each of the data devices 61-67 may correspond to a portion (including a whole portion) of one or more of the disk drives 24 (or more generally physical devices) of FIG. 2A. Thus, for example, the data device 61 may correspond to the disk drive 24a of FIG. 2A, may correspond to a portion of the disk drive 24b of FIG. 2A, or may correspond to both a portion of the disk drive 24a and a portion of the disk drive 24b. The data devices 61-67 may be designated as corresponding to different classes, so that different ones of the data devices 61-67 correspond to different physical storage having different relative access speeds or RAID protection type (or some other relevant distinguishing characteristic or combination of characteristics). Alternatively, in other embodiments that may be used in connection with the system described herein, instead of being separate devices, the data devices 61-67 may be sections of one data device.

Figure 4B:
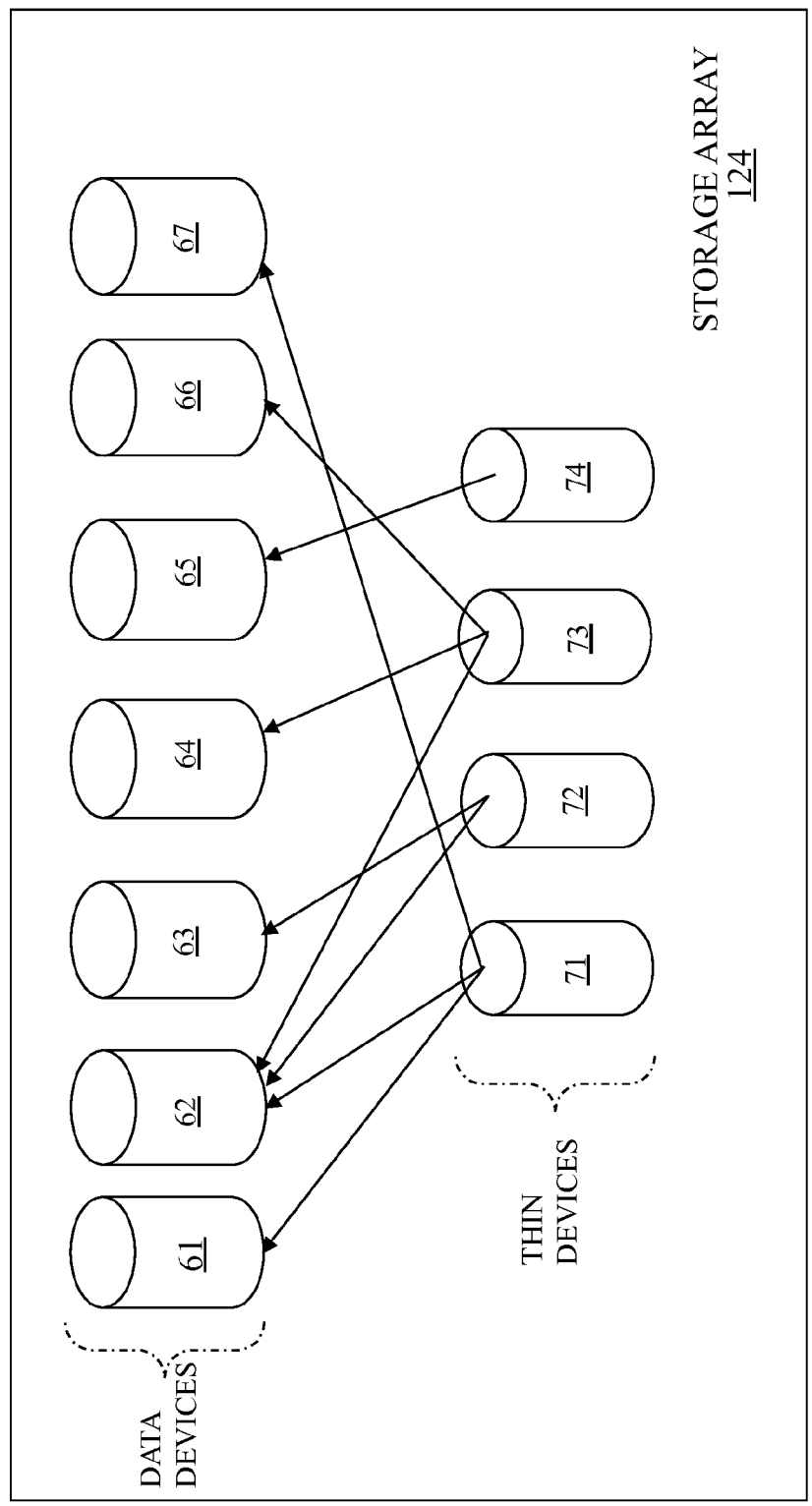

As shown in FIG. 4B, the storage array 124 may also include a plurality of thin or virtually provisioned devices 71-74 that may be adapted for use in connection with the system described herein when using thin provisioning. In a system using thin provisioning, the thin devices 71-74 may appear to a host coupled to the storage array 124 as one or more logical volumes (logical devices) containing contiguous blocks of data storage. Each of the thin devices 71-74 may contain pointers to some or all of the data devices 61-67 (or portions thereof). As described herein, a thin device may be virtually provisioned in terms of its allocated physical storage. A thin device is presented to a host as having a particular storage capacity. However, with thin devices, physical storage is allocated as needed as data is written/stored to the thin device rather than allocate physical storage for the entire thin device capacity upon creation of the thin device. As such, a thin device presented to the host as having a capacity with a corresponding LBA (logical block address) range may have portions of the LBA range for which storage is not allocated.

Figure 4C:
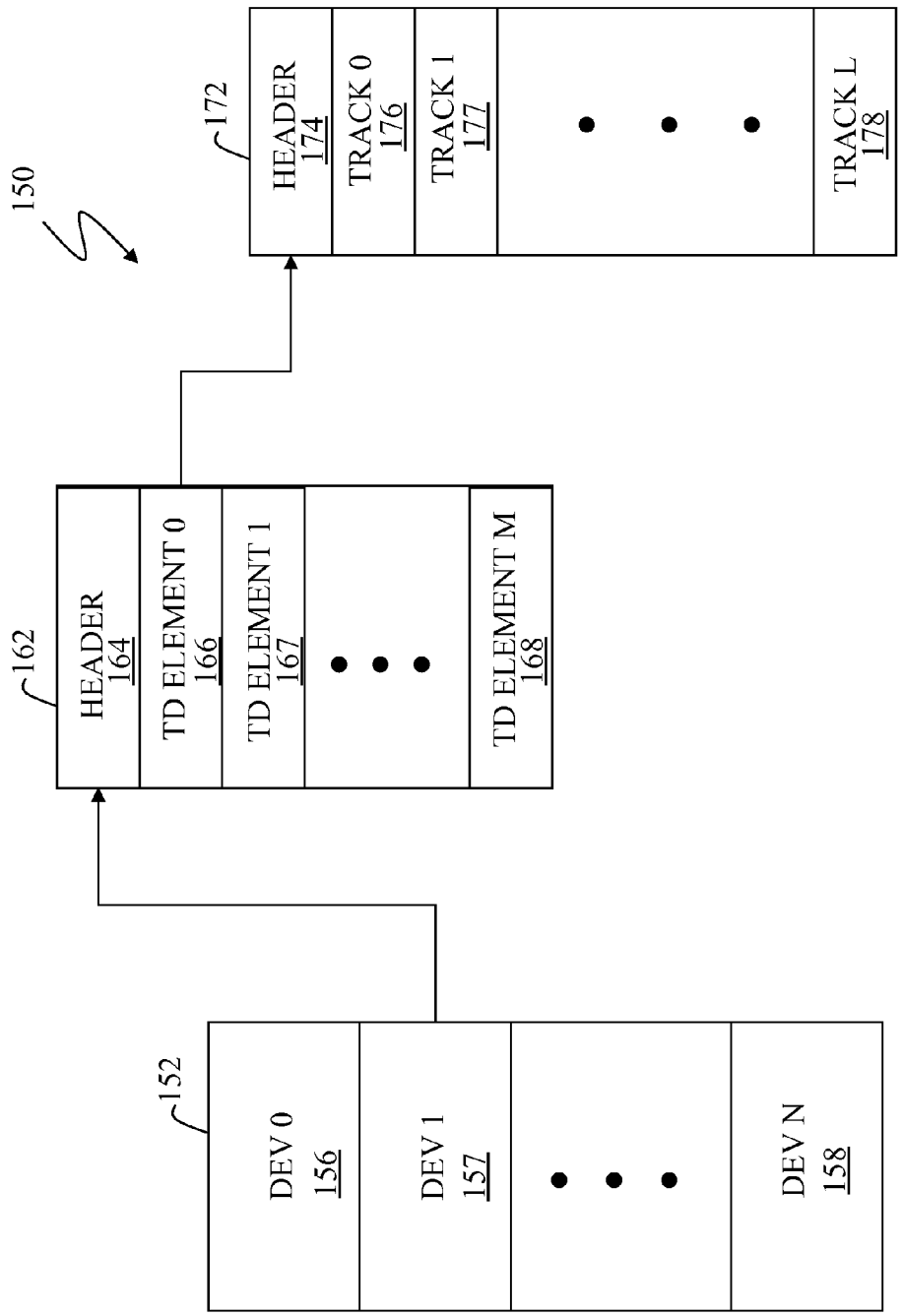
FIG. 4C is a schematic diagram illustrating tables that are used to keep track of device information in connection with an embodiment of the system described herein.

Referring to FIG. 4C, shown is a diagram 150 illustrating tables that are used to keep track of device information. A first table 152 corresponds to all of the devices used by a data storage system or by an element of a data storage system, such as an HA 21 and/or a DA 23. The table 152 includes a plurality of logical device (logical volume) entries 156-158 that correspond to all the logical devices used by the data storage system (or portion of the data storage system). The entries in the table 152 may include information for thin devices, for data devices (such as logical devices or volumes), for standard logical devices, for virtual devices, for BCV devices, and/or any or all other types of logical devices used in connection with the system described herein.

Each of the entries 156-158 of the table 152 correspond to another table that may contain information for one or more logical volumes, such as thin device logical volumes. For example, the entry 157 may correspond to a thin device table 162. The thin device table 162 may include a header 164 that contains overhead information, such as information identifying the corresponding thin device, information concerning the last used data device and/or other information including counter information, such as a counter that keeps track of used group entries (described below). The header information, or portions thereof, may be available globally to the data storage system.

The thin device table 162 may include one or more group elements 166-168, that contain information corresponding to a group of tracks on the data device. A track may be, for example, 128 blocks=64 Kbytes. A group of tracks may include one or more tracks, the number of which may be configured as appropriate. In an embodiment herein, each group has sixteen tracks, although this number may be configurable.

One of the group elements 166-168 (for example, the group element 166) of the thin device table 162 may identify a particular one of the data devices 61-67 having a track table 172 that contains further information, such as a header 174 having overhead information and a plurality of entries 176-178 corresponding to each of the tracks of the particular one of the data devices 61-67. The information in each of the entries 176-178 may include a pointer (either direct or indirect) to the physical address on one of the physical disk drives of the data storage system that maps to the logical address(es) of the particular one of the data devices 61-67. Thus, the track table 162 may be used in connection with mapping logical addresses of the logical devices corresponding to the tables 152, 162, 172 to physical addresses on the disk drives or other physical devices of the data storage system.

The tables 152, 162, 172 may be stored in the global memory 25b of the data storage system. In addition, the tables corresponding to particular logical devices accessed by a particular host may be stored (cached) in local memory of the corresponding one of the HA's. In addition, an RA and/or the DA's may also use and locally store (cache) portions of the tables 152, 162, 172.

Figure 4D:
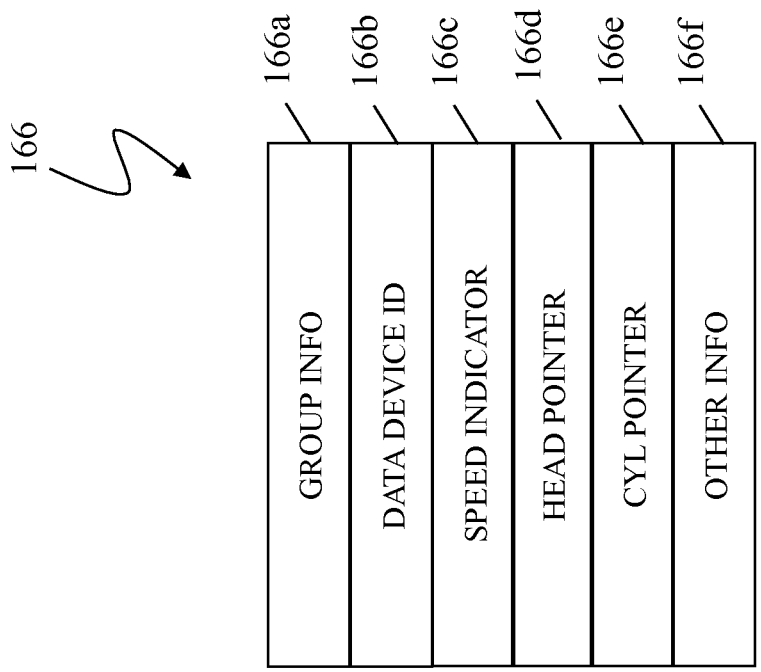
FIG. 4D is a schematic diagram showing a group element of a thin device table in connection with an embodiment of the system described herein.

Referring to FIG. 4D, shown is a schematic diagram illustrating a group element 166 of the thin device table 162 in connection with an embodiment of the system described herein. The group element 166 may include a plurality of entries 166a-166f. The entry 166a may provide group information, such as a group type that indicates whether there has been physical address space allocated for the group. The entry 166b may include information identifying one (or more) of the data devices 61-67 that correspond to the group (i.e., the one of the data devices 61-67 that contains pointers for physical data for the group). The entry 166c may include other identifying information for the one of the data devices 61-67, including a speed indicator that identifies, for example, if the data device is associated with a relatively fast access physical storage (disk drive) or a relatively slow access physical storage (disk drive). Other types of designations of data devices are possible (e.g., relatively expensive or inexpensive). The entry 166d may be a pointer to a head of the first allocated track for the one of the data devices 61-67 indicated by the data device ID entry 166b. Alternatively, the entry 166d may point to header information of the data device track table 172 immediately prior to the first allocated track. The entry 166e may identify a cylinder of a first allocated track for the one the data devices 61-67 indicated by the data device ID entry 166b. A cylinder may include multiple tracks. The entry 166f may contain other information corresponding to the group element 166 and/or the corresponding thin device. In other embodiments, entries of the group table 166 may identify a range of cylinders of the thin device and a corresponding mapping to map cylinder/track identifiers for the thin device to tracks/cylinders of a corresponding data device. In an embodiment, the size of table element 166 may be eight bytes.

Accordingly, a thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices, which are logical devices that map logical storage space of the data device to physical storage space on the disk drives or other physical storage devices. Thus, an access of the logical storage space of the thin device results in either a null pointer (or equivalent) indicating that no corresponding physical storage space has yet been allocated, or results in a reference to a data device which in turn references the underlying physical storage space.

Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

The thin devices 71-74 may appear to a host coupled to the storage system 124 as a logical volume (logical device) containing a contiguous block of data storage, as discussed herein. A first logical device layer, such as including thin devices 71-74 presented to the host, may be mapped to a second logical device layer of the data storage system, such as including data devices 61-67 whereby each of the data devices 61-67 of the second logical layer may map to storage areas across multiple physical storage drives. Thus, a portion of a thin device may be mapped to a portion of a data device which is further mapped to physical storage. The granularity of such portions at which the storage system described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage volumes or different sized data blocks within a single storage volume.

As described above, a thin device (also sometime referred to as a virtually provisioned (VP) device) is a device that represents a certain capacity having an associated address range. Storage may be allocated for thin devices in chunks or data portions of a particular size as needed rather than allocate all storage necessary for the thin device's entire capacity. Therefore, it may be the case that at any point in time, only a small number of portions or chunks of the thin device actually are allocated and consume physical storage on the back end (on physical disks, flash or other physical storage devices). A thin device may be constructed in allocation units or chunks having a size that may vary with embodiment. For example, in one embodiment, a chunk may correspond to a group of 1 or more physical storage device tracks (e.g., 1 track=64K bytes=128 blocks). In one embodiment described herein, storage may be allocated in atomic units of a single track=64 Kbytes. As also noted with a thin device, the different chunks may reside on different data devices. When data is first or initially written to a particular logical address of a thin device, storage may be allocated and mapped to the particular logical address. Subsequent writes to the same logical address may result in overwriting existing data stored on the currently allocated and mapped physical storage.

Figure 5:
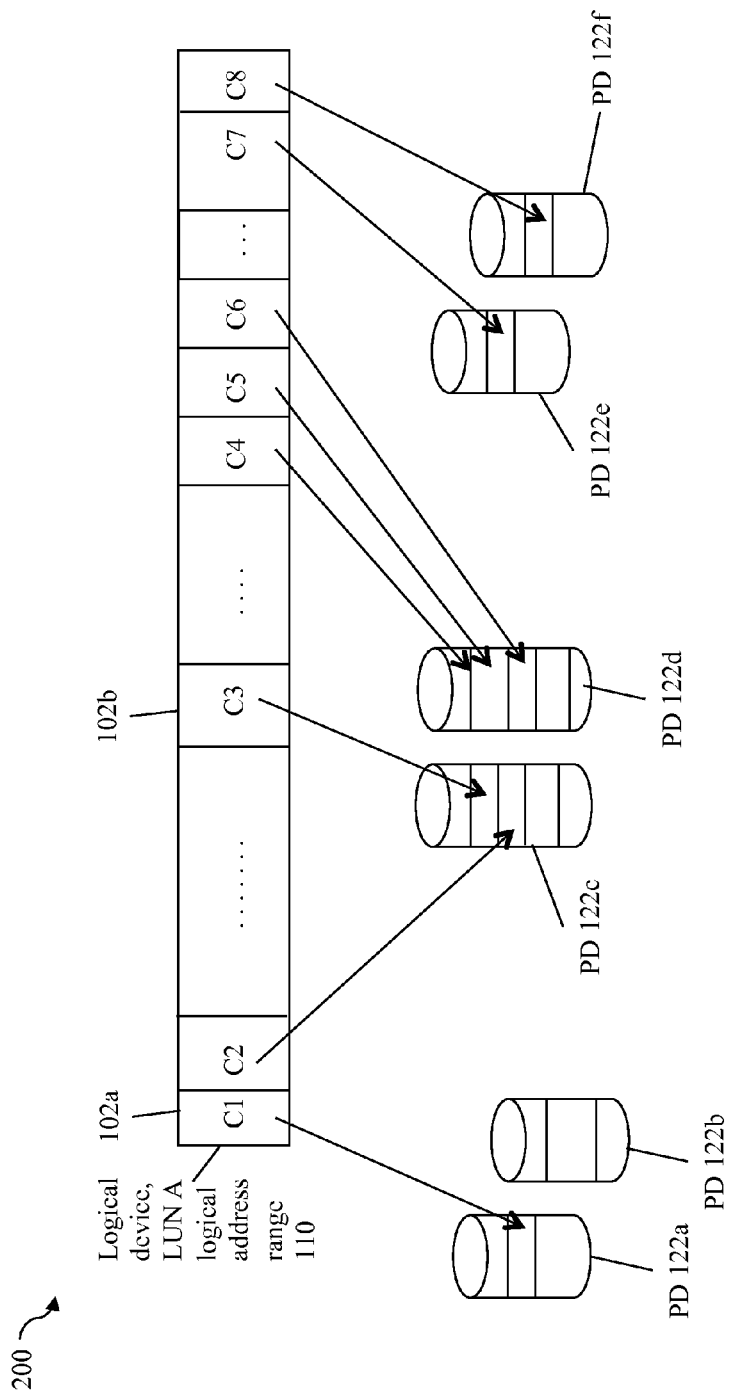
FIGS. 5, 6, 7A and 7C are examples illustrating mapping portions of a logical device having storage provisioned from physical devices in an embodiment in accordance with techniques herein.

Referring to FIG. 5, shown is an example illustrating a mapping of a logical address range of a logical device to physical storage devices in an embodiment in accordance with techniques herein. The example 200 includes physical devices (PDs) 122a-122f. Element 110 may represent a logical address range of a logical device, such as a LUN A, having different portions of data of the logical address range physically stored on different physical devices. The logical device may be a logical device which is visible and accessible to a host whereby the host accesses data of the logical device at different logical addresses as denoted by 200. Each of the square units or elements, such as 102a and 102b, included in 110 may denote a data portion of the logical address space of LUN A. LUN A may be a thick device or virtually provisioned device depending on the embodiment which is accessible to the host. If LUN A is a thick device, each portion of the logical address space 110 may be mapped (directly or indirectly through one or more other logical layers on the data storage system not illustrated) to a portion of physical storage. If LUN A is a virtually provisioned device, each portion of the logical address space 110 may or may not be indirectly mapped (through other logical layers on the data storage system not illustrated in FIG. 5 but described in more detail elsewhere herein) to a portion of physical storage depending on whether any data has been stored or written to the logical address space portions. Additionally, as described elsewhere herein, there may be one or more other mapping levels used to implement the mapping between the logical address range 110 and the PDs illustrated. For purposes of illustration, assume that LUN A is a thick or thin (e.g., virtually provisioned) LUN having storage allocated for all its data portions even though such mapping is only denoted for some particular data portions denoted C1-C8. Thus, FIG. 5 may represent a mapping of where data portions corresponding to the LUN A's logical address space are located (e.g., in what physical storage devices). It should be noted that the PDs 122a-f may be configured into one or more storage pools or logical groupings of PDs. For simplicity, assume that the PDs 122a-f are included in a single storage pool or logical grouping of PDs.

Figure 6:
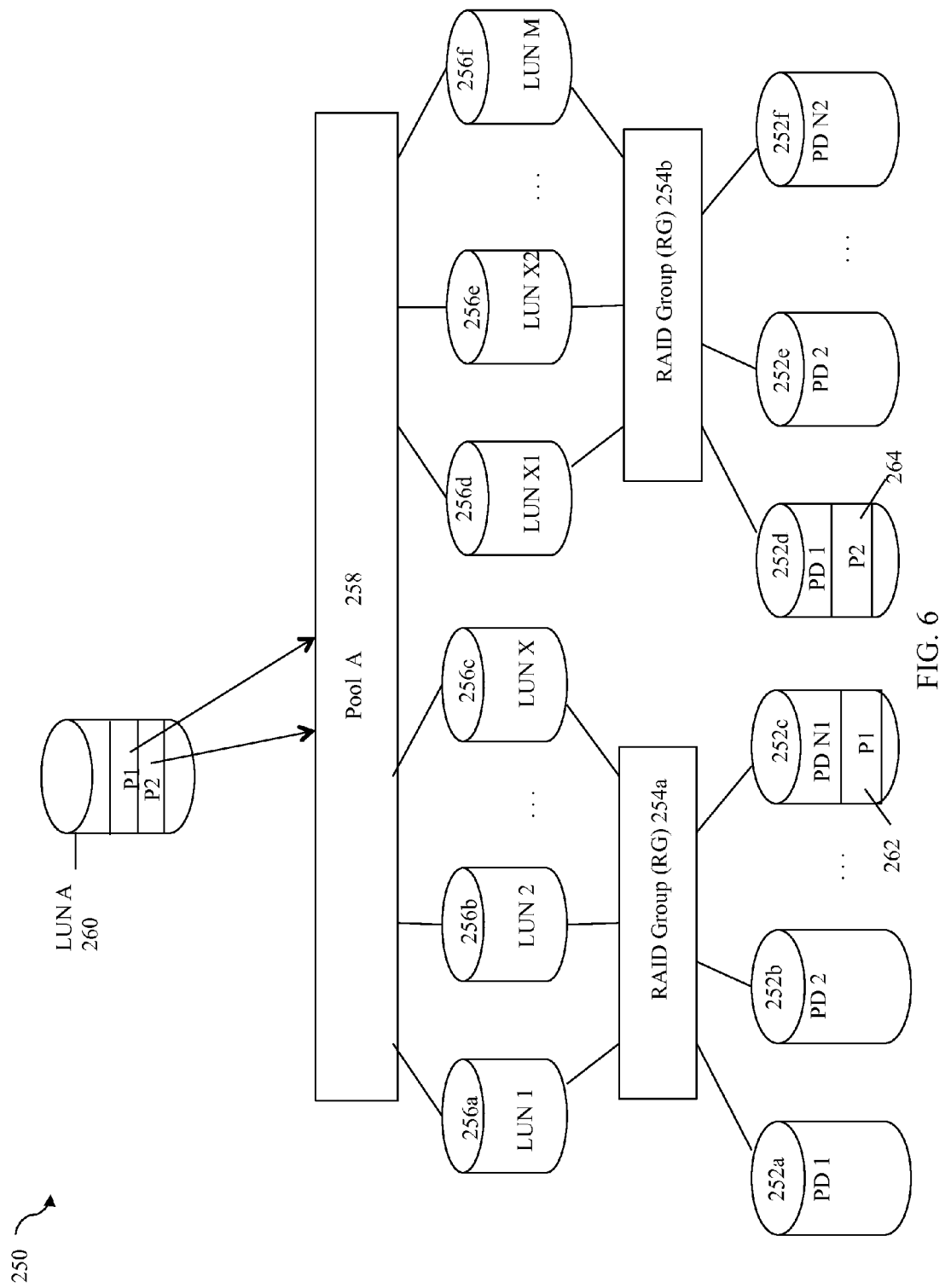

Referring to FIG. 6, shown is an example 250 illustrating in more detail how a storage pool A 258 and a logical device may be configured in an embodiment in accordance with techniques herein. The example 250 illustrates a storage pool 258 that includes PDs 252a-252f as described above. The PDs 252a-f may be configured into one or more RAID groups such as illustrated by 254a-b. As will be appreciated by those skilled in the art, the number of PDs in each RAID group may vary with the particular RAID level and configuration. A first level of logical devices illustrated by LUNs 256a-f may be configured from the RAID groups 254a-b whereby the LUNs 256a-f are included in the pool 258. A second level of one or more logical devices such as illustrated by LUN A 260 may be configured to have storage provisioned from the pool A 258. The LUN A 260 may be, for example, a thick LUN or a virtually provisioned thin LUN presented to the host or other client such as described in connection with FIG. 5. The LUN A 260 is illustrated as including two data portions P1 and P2 which may be mapped, respectively, through the different logical entities and levels illustrated in 250 to physical device locations 262 and 264. The example 250 is one way in which a pool 258 may be configured from which one or more LUNs such as 260 may have storage provisioned.

Figure 7A:
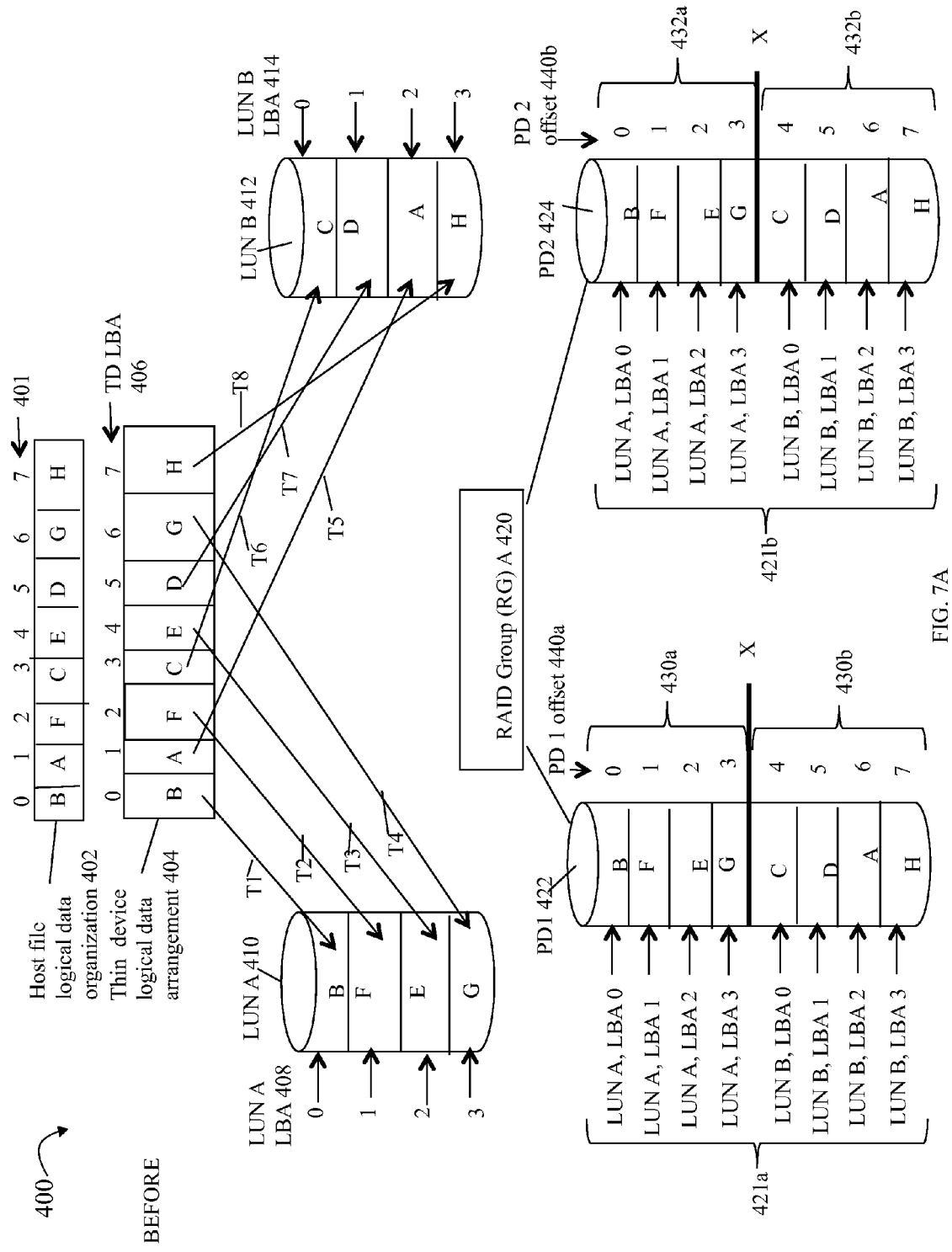

Referring to FIG. 7A shown is an example 400 illustrating logical and physical arrangements of data at a first point in time. Element 402 represents a first logical data organization such as of a host file. In other words, the host may write data to a file in the order "B A F C E D G H" whereby each alphabetic letter denotes data written to a next consecutive sequential block of the file by the host. Element 401 denotes the file-based logical addresses or offsets in the file. Based on 401 and 402, B is stored at file offset 0, A is stored at file offset 1, F is stored at file offset 2, C is stored at file offset 3, E is stored at file offset 4, D is stored at file offset 5, G is stored at file offset 6 and H is stored at file offset 7. The host may send the foregoing data to be written to the file to the data storage system. As described elsewhere herein (such as in FIG. 3) and known in the art, the host may map a file-based logical location (e.g., the logical locations or offsets in the file) to a logical device location or logical address (e.g., such as a logical block address (LBA) in the logical device). The logical device may be a thin or virtually provisioned device as described herein that is presented to the host by the data storage system. The target location to which data is written may be included in write commands sent by the host to the data storage system whereby the target location may expressed in terms of the logical device and LBA. In this example, the logical device may be a thin device (TD) having a logical data arrangement 404 with a logical address range from 0-7, inclusively, as denoted by TD LBA 406. Element 404 indicates the data written to the particular LBAs of the logical device. For purposes of discussion in this example, TD may be used to refer to the logical device which is a thin device having the LBA and logical data arrangement as illustrated by 404 and 406.

LUN A 410 and LUN B 412 may represent a second level of logical devices including two data devices whereby TD logical addresses of 404, 406 are mapped to particular data device logical addresses as denoted by arrows T1-T8. Element 408 denotes the LBA or logical address range of LUN A as 0-3, inclusively. Element 414 denotes the LBA or logical address range of LUN B as 0-3, inclusively. The following table, TABLE 1, summarizes the data stored at the various TD logical addresses and also the TD logical address to data device logical address mappings denoted by arrows T1-T8:

| Arrow | TD LBA | Host file data stored | Data Device | LBA |
|---|---|---|---|---|
| T1 | 0 | B | LUN A | 0 |
| T5 | 1 | A | LUN B | 2 |
| T2 | 2 | F | LUN A | 1 |
| T6 | 3 | C | LUN B | 0 |
| T3 | 4 | E | LUN A | 2 |
| T7 | 5 | D | LUN B | 1 |
| T4 | 6 | G | LUN A | 3 |
| T8 | 7 | H | LUN B | 3 |

PD1 422 and PD 424 may be two physical devices configured into a single RAID group (RG) A 420. In this example, RG A 420 may be a RAID-1 configuration including the foregoing two PDs 422, 424 whereby blocks stored on PD 1 422 are mirrored on PD 2 424 with no parity or striping. Element 430a indicates that data device LUN A 410 has physical storage provisioned on PD 1 422, at offsets 0-3. Element 432a indicates that data device LUN A 410 has physical storage provisioned on PD 2 424, at offsets 0-3. Element 430b indicates that data device LUN B 412 has physical storage provisioned on PD 1 422, at offsets 4-7. Element 432b indicates that data device LUN B 412 has physical storage provisioned on PD 2 424, at offsets 4-7. Data located at the various logical addresses of LUN A has a first copy stored on PD1 422 offsets 0-3 which is respectively mirrored on PD2 424 offsets 0-3. Data located at the various logical addresses of LUN B has a first copy stored on PD 1 422 offsets 4-7 which is respectively mirrored on PD2 424 offsets 4-7.

For simplicity of illustration, it should be noted that the offsets used in connection with the PDs and different logical devices (such as the thin device TD and data devices) are illustrated and incremented by 1 for each block stored in a manner consistent with other figures herein to denote a number of blocks rather than other size units.

Element 421a denotes the mapping of data device locations on LUN A 410 and LUN B 412 to particular PD address locations or offsets on the PD 1 422. Similarly, element 421b denotes the mapping of data device locations on LUN A 410 and LUN B 412 to particular PD address locations or offsets on the PD 2 424. Element 440a denotes the physical device locations or offsets on PD1 422. Element 440b denotes the physical device locations or offsets on PD2 424.

The following table, TABLE 2, summarizes the data device to PD physical address mappings denoted by 421a and 421b and also the host file data stored at the different PD locations:

| Data Device | LBA | Host file data stored | PD offset/location |
|---|---|---|---|
| LUN A | 0 | B | PD1, offset 0 and PD2 offset 0 |
| LUN A | 1 | F | PD1, offset 1 and PD2 offset 1 |

| Data Device | LBA | Host file data stored | PD offset/location |
|---|---|---|---|
| LUN A | 2 | E | PD1, offset 2 and PD2 offset 2 |
| LUN A | 3 | G | PD1, offset 3 and PD2 offset 3 |
| LUN B | 0 | C | PD1, offset 4 and PD2 offset 4 |
| LUN B | 1 | D | PD1, offset 5 and PD2 offset 5 |
| LUN B | 2 | A | PD1, offset 6 and PD2 offset 6 |
| LUN B | 3 | H | PD1, offset 7 and PD2 offset 7 |

Based on the example 400 of FIG. 7A, at the first point in time the host may issue 8 writes to write the data of 402 to the file whereby the 8 writes reference the following TD logical device LBAs in order: 0 1 2 3 4 5 6 7. At subsequent points in time, various I/Os may be performed to read and/or write data to different file locations and whereby such I/Os reference different file locations and different corresponding TD logical device LBAs than as in the initial pattern of "0 1 2 3 4 5 6 7".

Accordingly, an embodiment may record or track all I/O operations performed such as at the block level. In this manner, all read and write operations issued by the host to a particular logical device as presented to the host by the data storage system, such as illustrated in FIG. 7A, may be tracked. As described in following paragraphs, such information regarding I/O operations issued, may be analyzed to detect an access pattern used to arrange, or rearrange, user data to facilitate, for example, performing various optimizations.

Some embodiments in accordance with techniques herein may leverage existing product functionality (e.g., as may be embodied in hardware and/or software) to record all read and write operations at the block level. For example, at least one embodiment may utilize functionality of a product, such as EMC RecoverPoint® by EMC Corporation, which provides continuous data protection by tracking all writes at the block level by recording all block level writes in a journal or log. Functionality of EMC RecoverPoint® may be utilized to record block level writes and also further expanded to record all block level reads in a journal or log. The foregoing is only one way in which read and write operations may be tracked in an embodiment in accordance with techniques herein. More generally, an embodiment in accordance with techniques herein may use any suitable technique to keep a journal or log of block level read and write operations performed to one or more LUNs. Using the log or journal of recorded read and write operations, an embodiment may determine client data access patterns where the client, such as a host, accesses the same data with repeated ordering which may be different than the sequential logical address ordering (e.g., LBA (logical block address) ordering) of the host visible logical addresses. Logical device TD as described above may be exposed or made visible to a host which accesses data stored at multiple LBAs of TD in a time ordered series. For example, at 8 sequential points in time, the host may access data located at LBA 1, LBA 0, LBA 3, LBA 5, LBA 4, LBA 2, LBA 6, and LBA 7 for performing reads and/or writes. The log or journal may record the foregoing 8 I/O operations as being performed in order at 8 different points in time. From analyzing the log, a non-sequential data access pattern may be determined based on the LBA accesses of 1, 0, 3, 5, 4, 2, 6 and 7. The data access pattern may be characterized as including a list of LBAs of the TD which is time-ordered based on the order in which consecutive I/O operations are performed which access the particular LBAs. The data access pattern may be non-sequential in that the ordered list of LBAs may be not contiguous or consecutive. Furthermore, such a non-sequential data access pattern of LBA accesses may include all reads, all writes, or a mix of read and writes performed in a time ordered sequence. In other words, a first I/O at a first point in time is directed to TD, LBA 1. A second I/O at a second point in time is directed to TD, LBA 0. A third I/O at a third point in time is directed to TD, LBA 3. A fourth I/O at a fourth point in time is directed to TD, LBA 5, and so on, for the 8 I/Os occurring at 8 consecutive points in time. Each of the foregoing 8 I/Os may be either a read or a write operation. The analysis may identify data access patterns based on the particular ordering of LBA accesses of the logical device TD by the host. The logical device may be the TD (which may be a thin device) presented by the data storage system to the host. The ordering of LBA accesses specified is the order in which the host issues I/O operations to data storage system whereby the LBAs accessed form a repeated LBA access pattern that may be non-sequential.

Figure 7B:
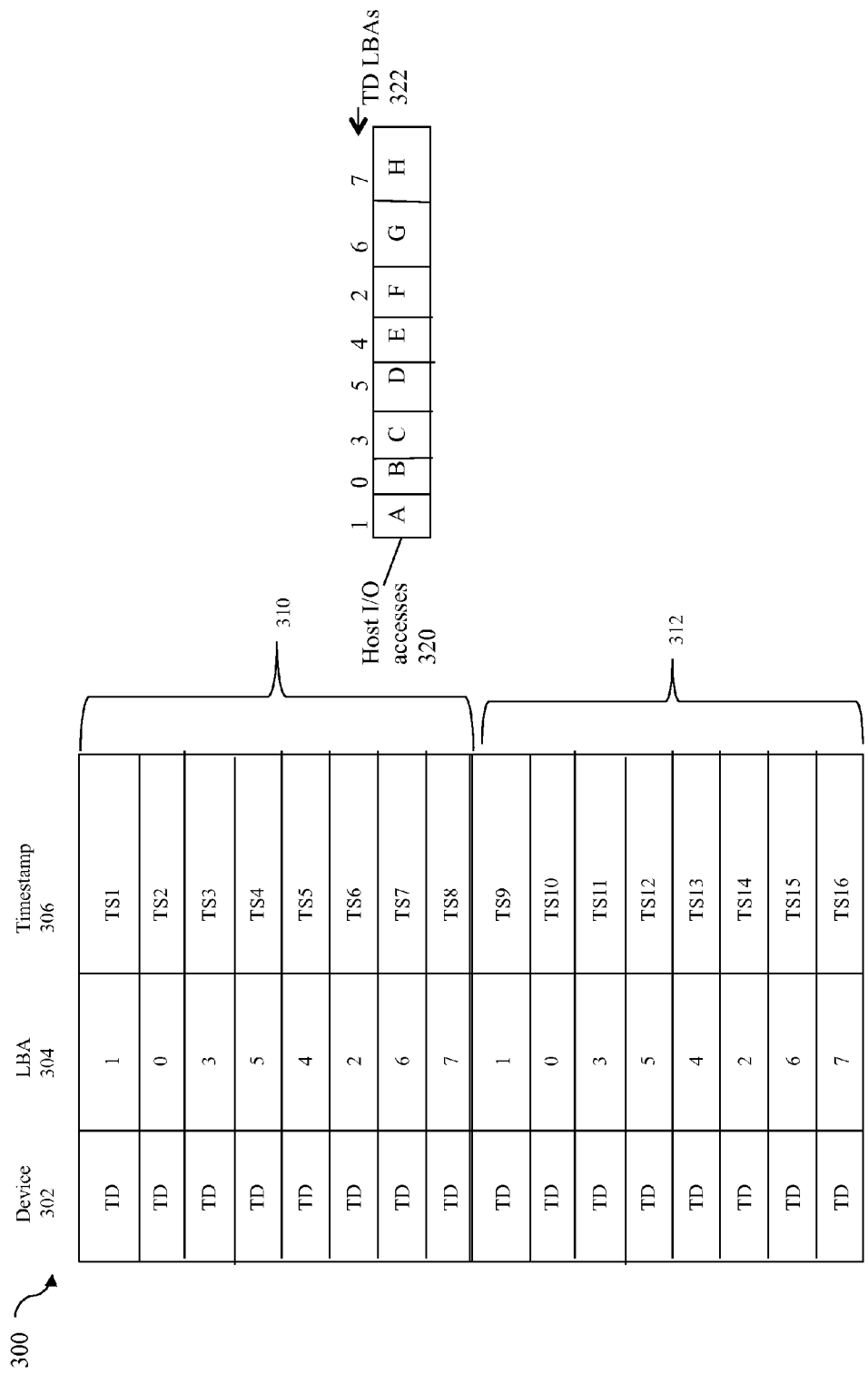
FIG. 7B is an example of a data access pattern and data that may be included in a log of tracked I/O operations in an embodiment in accordance with techniques herein.

Referring to FIG. 7B, shown is an example 300 of information that may be recorded in a log or journal in an embodiment in accordance with techniques herein. The example 300 is a table including a row of information for each I/O operation performed and thus recorded. The table of 300 illustrates that information of a log file of recorded I/O operations may include, for each recorded I/O operation, the device 302 identifying the logical device, presented by the data storage system to the host, to which the recorded I/O operation is directed, the LBA 304 identifying a logical block address or offset on the device 302 to which the recorded I/O operation is directed, and a timestamp 306 identifying a date and time at which the recorded I/O operation is performed. It should be noted that the log may include other information other than as illustrated in the example 300. For example, the log may also denote the type of I/O operation as a read or a write, the data written if the I/O operation is a write operation, and the like. For purposes of identifying data access patterns of logical addresses on a particular logical device, the information illustrated in the example 300 may be utilized. In the example 300, each entry in the table represents information recorded for a single I/O operation directed to an LBA (column 304) on a device (column 302), denoted as TD, which may be a thin or virtually provisioned device. The values specified in the timestamp column 306 may be used to determine a time-ordered sequence or ordering of the recorded data accesses denoted by the table rows. The timestamps of 306 are represented by occurrences of TSi, where "i" may be an integer greater than 0. The order in which the I/Os represented by the rows of 300 occur relative to each other are based on the values specified for "i" in the illustrated timestamp values whereby for integers "j" and "k" each greater than zero and j<k, TSj denotes that an first I/O operation represented by a row of 300 including TSj occurs at a point in time prior to a second I/O operation represented by a row of 300 including TSk.

Elements 310 and 312 each represent a repeated non-sequential data access pattern including a time-ordered list of consecutively accessed LBAs of device TD (e.g., non-sequential data access pattern includes the following LBAs of device TD="1 0 3 5 4 2 6 7"). By analyzing the information of the log 300, the foregoing is an example of a data access pattern that may be identified.

It should be noted that a pattern may be generally identified as any recurring or repeated LBA access pattern that is at least a specified threshold minimum length whereby the minimum length denotes a minimum number of LBAs. The LBA access pattern may be repeated a threshold number of times in the log, where the threshold number of times may be any suitable integer greater than 1. An embodiment may specify default and/or configurable values for the threshold number of times and threshold length of the LBA access pattern used in determining non-sequential data access patterns. For example, an embodiment may specify that, for a particular LBA access pattern to be identified as a repeated non-sequential data access pattern, the identified LBA access pattern must have a minimum length, such as three (3), and must repeat a minimum number of times, such as two (2).

The identified pattern denoted by a list of consecutive LBA accesses, such as "1 0 3 5 4 2 6 7" in the example 300, specifies LBAs which are accessed consecutively in the order specified in the pattern. Repeated occurrences of the non-sequential LBA pattern may or may not be consecutive. For example, a first occurrence of the identified LBA access pattern "1 0 3 5 4 2 6 7" may be denoted by element 310 and a second occurrence of the same pattern may be denoted by element 312. Although not illustrated by data recorded in 300, one or more other I/O operations directed to device TD may occur between 310 and 312 (e.g., may occur between the times denoted by the timestamps TS8 and TS9). However, no intervening I/O operations directed to device TD may occur between any of the 8 I/Os represented by 310 forming the identified pattern (e.g., LBA sequence 1 0 3 5 4 2 6 7), and similarly no intervening I/O operations directed to device TD may occur between any of the 8 I/Os represented by 312 forming the identified pattern.

In this example, assume that the I/O operations forming the identified LBA pattern "1 0 3 5 4 2 6 7" for the logical device TD as described in FIG. 7B are read operations. Consistent with description of FIG. 7B, element 320 denotes the host I/O access pattern for the TD LBA accesses just described and the associated data located at each of the LBAs in the sequence 1 0 3 5 4 2 6 7.

In accordance with techniques herein, processing may be performed to rearrange the location of data on the data devices LUN A and LUN B, and thus may also physically rearrange or relocate data stored at PD locations based on the data device rearrangement. The thin device data may be rearranged to have data device locations on LUN A and LUN B based on the detected non-sequential thin device data access pattern. More specifically, the non-sequential TD LBA access pattern accesses a set of data portions stored on the TD in a particular consecutive sequential order. For example as denoted by 320 and 322 of FIG. 7B, the TD non-sequential LBA access pattern is "1 0 3 5 4 2 6 7". The particular data portions (or data) stored at each of the foregoing TD LBAs in the pattern may be determined and located at consecutive sequential data device logical addresses based on the ordering in the identified access pattern. For example, with reference to FIG. 7B, the data located at each of the LBAs of the identified access pattern "1 0 3 5 4 2 6 7" is "A B C D E F G H".

Figure 7C:
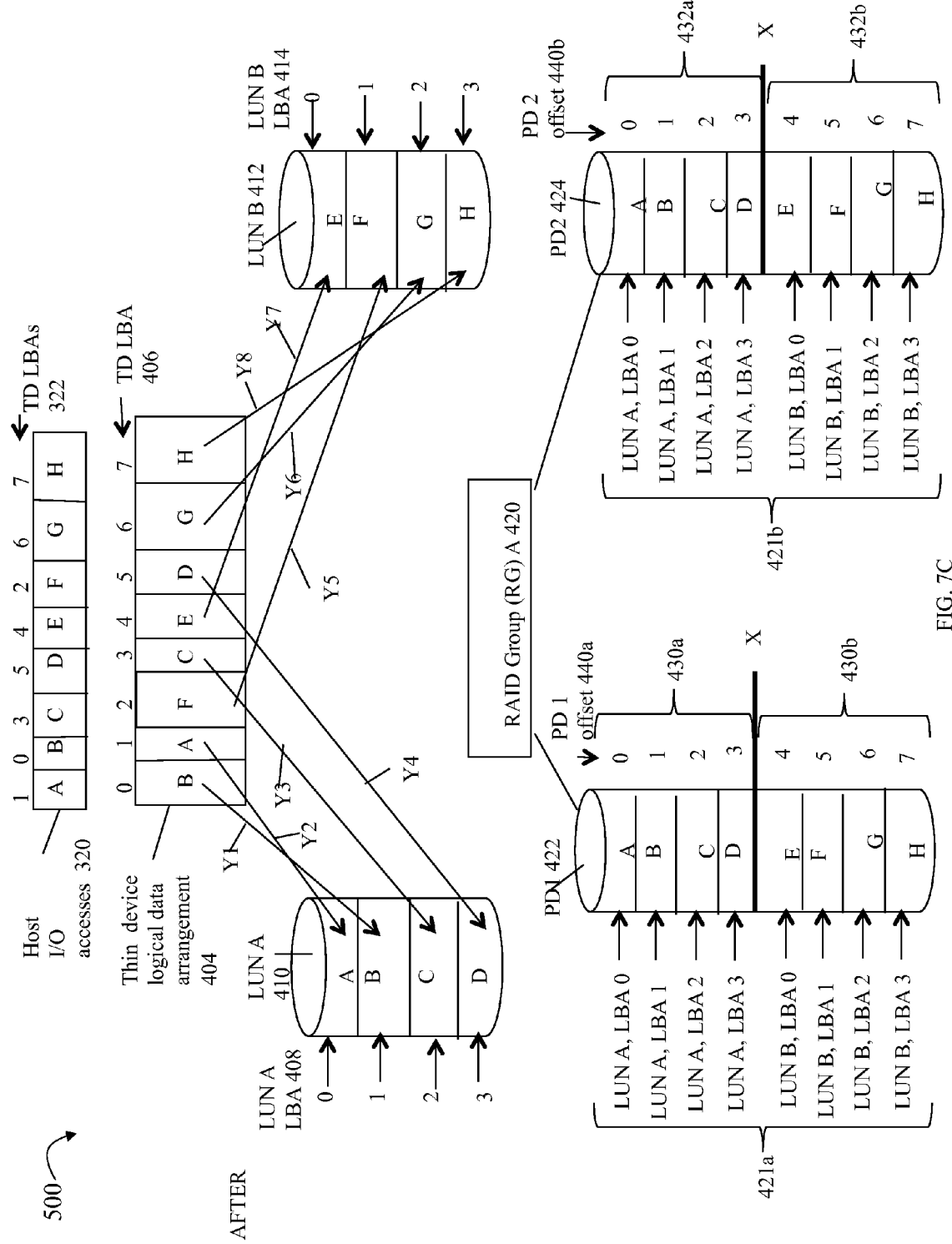

As illustrated in FIG. 7C, the data "A B C D E F G H" may be arranged to have corresponding logical addresses on the data device(s) based on the non-sequential data access pattern. In this example, the data is arranged on data devices LUN A 410 and LUN B 412 to have an ordering of consecutive data device logical addresses based on the identified non-sequential data access pattern. In this manner, assuming the TD data is again accessed in the same order as in the identified non-sequential LBA access pattern "1 0 3 5 4 2 6 7", the non-sequential TD LBA access pattern maps to a sequential data device access pattern as follows:

LUN A, LBA 0
LUN A, LBA 1
LUN A, LBA 2
LUN A, LBA 3
LUN B, LBA 0
LUN B, LBA 1
LUN B, LBA 2
LUN B, LBA 3

With reference to FIG. 7C, the example 500 includes elements as described in connection with FIG. 7A which are similarly numbered. For example, the example 500 includes the thin device logical data arrangement 404, data devices 410, 412 and PDs 422, 424 forming RG A 420.

One difference between FIGS. 7A and 7C is that in the example 500, data of the TD has been arranged or relocated to data device locations based on the identified TD LBA data access pattern "1 0 3 5 4 2 6 7". In particular, the consecutively accessed TD data is also consecutively arranged on the data devices LUN A and LUN B (e.g. TD data corresponding to the identified access pattern is arranged on the data devices to have consecutive logical addresses on the data devices). For example, the first 4 data portions or data items stored at the first 4 LBAs of the access pattern are "A B C D" which now have consecutive logical addresses 0-3 on LUN A 410. The next 4 data portions or data items stored at the next 4 LBAs of the access pattern are "E F G H" which now have consecutive logical addresses 0-3 on LUN B 410.

As a variation to the example 500, it should be noted that a different number of one or more data devices may be used than as illustrated. For example, a single data device having a logical address range of 0-7 may be used rather than 2 data devices 410, 412 as illustrated in FIG. 7C. In such a case, the 8 data portions "A B C D E F G H" of the identified TD LBA access pattern may be respectively located at the logical addresses 0-7 of the single data device.

Another difference between FIGS. 7A and 7C is that in the example 500, the various TD LBAs as denoted by 404 and 406 are now mapped to different data device locations on LUN A 410 and LUN B 412. The data stored at the TD LBAs of the access pattern has been located in consecutive sequential data device logical address locations based on the identified TD LBA data access pattern "1 0 3 5 4 2 6 7". In particular, the arrows Y1-Y8 denote the mapping of TD logical addresses (as denoted by 404 and 406) to particular data device logical addresses.

The following table, TABLE 3, summarizes the data stored at the various TD logical addresses and also the TD logical address to data device logical address mappings denoted by arrows Y1-Y8:

| Arrow | TD LBA | Host file data stored | Data Device | LBA |
|---|---|---|---|---|
| Y1 | 0 | B | LUN A | 1 |
| Y2 | 1 | A | LUN A | 0 |
| Y5 | 2 | F | LUN A | 1 |
| Y3 | 3 | C | LUN B | 0 |
| Y7 | 4 | E | LUN A | 2 |
| Y4 | 5 | D | LUN B | 1 |
| Y6 | 6 | G | LUN A | 3 |
| Y8 | 7 | H | LUN B | 3 |

As illustrated by Y1 of FIG. 7C, the first TD LBA of the identified access pattern "1 0 3 5 4 2 6 7" is LBA=1 whereby TD LBA 1 is now mapped to a first logical address LBA 0 on data device LUN A. Subsequent TD LBAs of the identified access pattern are now mapped to data device logical addresses which are consecutive to the foregoing first logical address LBA 0. In particular, the second through fourth TD LBAs (e.g., LBAs 0, 3 and 5) of the identified access pattern are now respectively mapped to data device logical addresses LBA 1-3 of LUN A. The fifth TD LBA (e.g., LBA 4) of the identified access pattern is now mapped to logical address LBA 0 on data device LUN B. The next consecutive TD LBAs of the identified access pattern are now mapped to data device logical addresses which are consecutive to the foregoing logical address LBA 0 of LUN B. In particular, the sixth through eighth TD LBAs (e.g., LBAs 2, 6, and 7) of the identified access pattern are now respectively mapped to data device logical addresses LBA 1-3 of LUN B.

Yet another difference between FIGS. 7A and 7C is that the physical storage locations on PDs 422, 424 at which the TD data is stored have changed due to the rearrangement of the TD data to data device logical addresses. The following TABLE 4 summarizes the revised data device logical address to physical storage location mapping as illustrated by 421a, 421b in the example 500:

| Data Device | LBA | Host file data stored | PD offset/location |
| --- | --- | --- | --- |
| LUN A | 0 | A | PD1, offset 0 and PD2 offset 0 |
| LUN A | 1 | B | PD1, offset 1 and PD2 offset 1 |
| LUN A | 2 | C | PD1, offset 2 and PD2 offset 2 |
| LUN A | 3 | D | PD1, offset 3 and PD2 offset 3 |
| LUN B | 0 | E | PD1, offset 4 and PD2 offset 4 |
| LUN B | 1 | F | PD1, offset 5 and PD2 offset 5 |
| LUN B | 2 | G | PD1, offset 6 and PD2 offset 6 |
| LUN B | 3 | H | PD1, offset 7 and PD2 offset 7 |

It should be noted that a particular advantage with a RAID 1 configuration exists whereby the physical locations of data on the PDs have a sequential consecutive ordering corresponding to that of the data device logical addresses. Two data portions having consecutive data device logical addresses also have consecutive physical address locations on a physical device. In this manner, a data access pattern corresponding to sequential consecutively accessed data device logical addresses results in sequential consecutive physical device location accesses. As will be appreciated by those skilled in the art, the existence of the foregoing advantage varies with the underlying RAID group configuration or more generally may vary with the physical storage configuration.

With reference to the arrangement of FIG. 7C whereby a data access pattern corresponding to sequential consecutively accessed data device logical addresses results in sequential consecutive physical device location accesses, sequential stream recognition processing may be performed by code of the physical storage device or drive, such as corresponding to each PD instance 422, 424. Such sequential stream recognition processing may be performed to recognize a sequential read access pattern of consecutive physical device locations and then, responsive to detecting such a pattern, perform processing to prefetch data stored at one or more subsequently located physical device locations of the recognized stream. Sequential stream recognition processing and prefetch processing are well known in the art but typically used in connection with recognizing an occurrence of a sequential consecutive access pattern of logical addresses of a logical device as presented to the host and then prefetching data based on this sequential access pattern. For example, sequential stream recognition processing may be typically performed by an FA or other front end adapter that receives host I/Os directed to a logical device and an LBA offset of the logical device whereby the logical device is presented by the data storage system to the host. For example, the logical device referenced by the host when locations to read and/or write data may be a thin device. Although an embodiment in accordance with techniques herein may perform such processing by an FA or front end component, techniques herein provide for having code execute on the physical drive to perform sequential stream recognition processing of a read access pattern of consecutive and contiguous physical device locations. In accordance with techniques herein, a series of consecutive and contiguous physical device read accesses may be recognized as a sequential stream after a specified number of consecutive reads access consecutive and contiguous physical locations on the PD.

Figure 8:
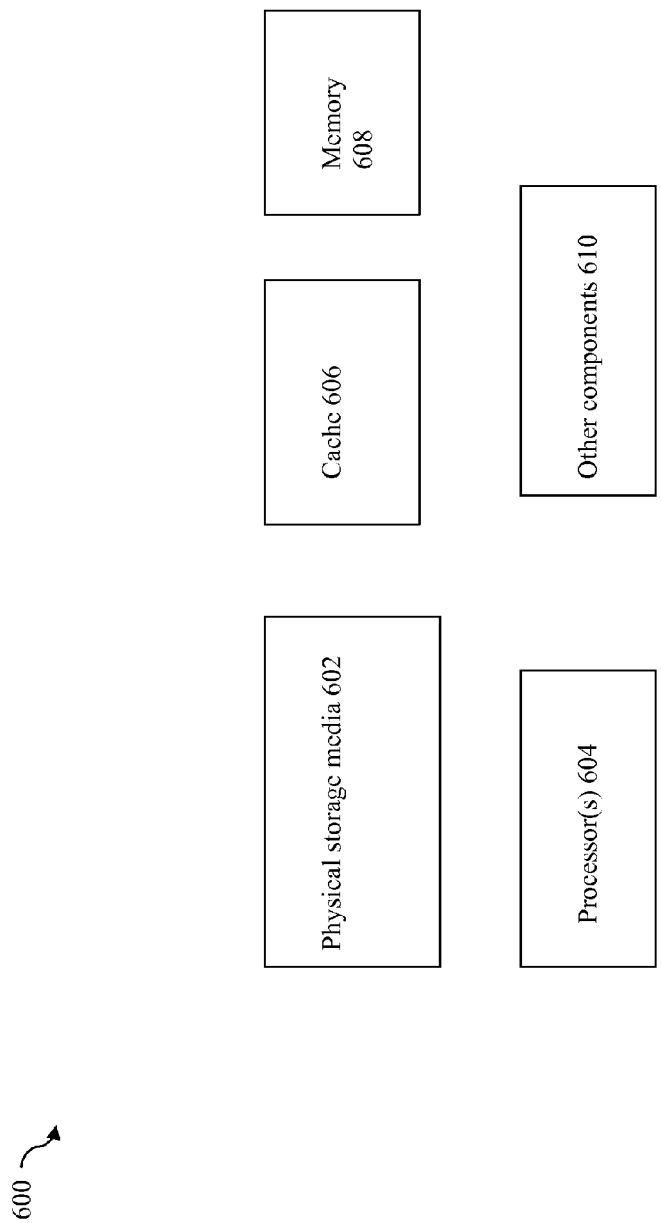
FIG. 8 is an example of components that may be included in a physical device such as a storage drive unit in an embodiment in accordance with techniques herein.

With reference to FIG. 8, shown is a block diagram 600 of components that may be included in a physical drive or device in an embodiment in accordance with techniques herein. The example 600 includes physical storage media 602, one or more processors 604, a cache 606, additional memory 608 and possibly other components 610 that may vary with the particular drive. The physical drive or storage device may be, for example, a rotating disk drive or a solid state storage device. Assuming the physical drive is a rotating disk drive, the physical storage media 602 may be disk platter to which data is written to and read from. The cache 606 may be any suitable form of memory such as described elsewhere herein. The memory 608 may also be any suitable form of memory and may include code which is executed by one of the processors 604 to perform sequential stream recognition processing to recognize a sequential read access pattern of consecutive contiguously location physical device storage locations. For example, processing may be performed whereby code of the physical device determines whether a predetermined number of consecutive reads, such as 2 or 3 reads, access consecutive contiguous sequential physical locations on the device. Responsive to determining that a current read access is part of a sequential stream of consecutive read operations to access consecutive contiguous physical storage locations, the code may then perform processing to prefetch data located at one or more subsequent physical storage locations of the sequential access pattern prior to such data being requested. For example, with reference back to FIG. 7C, code executing on the PD 1 422 may track physical locations accessed for two read requests to read data from PD 1, offsets 0 and 1. A third read request may be received by the PD to now read data from PD 1, offset 2. Responsive to receiving the third read request, code executing on the PD to perform sequential stream recognition processing may determine that the read requests are part of a sequential stream. Additionally, responsive to recognizing that the read requests are part of a sequential stream, the PD may obtain the data requested by the third read request and may additionally prefetch data from one or more subsequent locations of the recognized sequential stream prior to such data being requested. For example, processing may be performed to prefetch data from physical locations 3 and 4 on PD 1 and store the prefetched data in the cache 606 along with the requested data at PD 1, offset 2 (as requested in the third read request). Generally, an embodiment may prefetch any suitable amount of data.

Such sequential stream recognition processing and prefetch processing by a physical device with respect to a sequential consecutive stream physical device locations which are read may be advantageously used to improve performance of physical devices included in RAID-1 configurations with mirroring and also without striping and without parity such as illustrated in FIGS. 7A and 7C. More generally, such processing may be performed by PDs configured in an arrangement whereby two data portions having consecutive data device logical addresses also have consecutive and contiguous physical address locations on a PD. In this manner, a data access pattern corresponding to sequential consecutively accessed data device logical addresses results in sequential consecutive physical device location accesses. Without having such a relationship whereby consecutive contiguous data device logical addresses have corresponding consecutive contiguous physical device locations, it may be the case that physical device locations may not be accessed in a sequential consecutive order and may not benefit from an sequential stream recognition processing performed by the PD with respect to physical locations.

An embodiment in accordance with techniques herein may also have the DAs or disk controllers which access the physical storage devices perform sequential stream recognition processing to recognize a sequential stream of consecutive read accesses based on consecutive contiguous data device logical address accesses. The DAs may also perform prefetch processing responsive to determining that a current read request is part of a sequential stream of consecutive contiguous logical addresses accesses of a data device. In other words, in a manner similar to that as just described for physical device locations, the DA may perform processing to recognize a sequential stream with respect to contiguous data device logical addresses and, responsive to recognizing that a read request is included in a sequential stream, prefetch additional data of the sequential stream. Such prefetched data may be placed in the cache or global memory of the data storage system such as illustrated in FIG. 2A. More generally, a component of the data storage system other than the DA may perform such processing for sequential stream recognition processing and prefetch processing with respect to data device logical addresses. For example, with reference back to FIG. 7C, an embodiment may perform processing to track the LBAs of the data device which are read consecutively. Consistent with description herein and known in the art, it may be determined that a current read request to read data from a first LBA of a data device is part of a sequential stream if a specified number of previous read requests (e.g. such as one or two) have read data located at LBAs of the data device immediately prior to the first LBA. For example, a first read request may read data located at data device LUN A, LBA 0 and a second read request may read data located at data device LUN A, LBA 1. Upon receiving a third request to read data located at data device LUN A, LBA 2, processing may determine that the third request is part of a sequential stream. In response, the requested data of LUN A, LBA 2 may be retrieved from physical storage. Additionally, prefetch processing may be performed to prefetch additional data of the sequential stream even though the additional data has not yet been requested. For example, processing may be performed to obtain requested data of LUN A LBA 2 and additional prefetch the data located at LUN A, LBA 3 (as illustrated by the data device to PD mappings in FIG. 7C).

Figure 9:
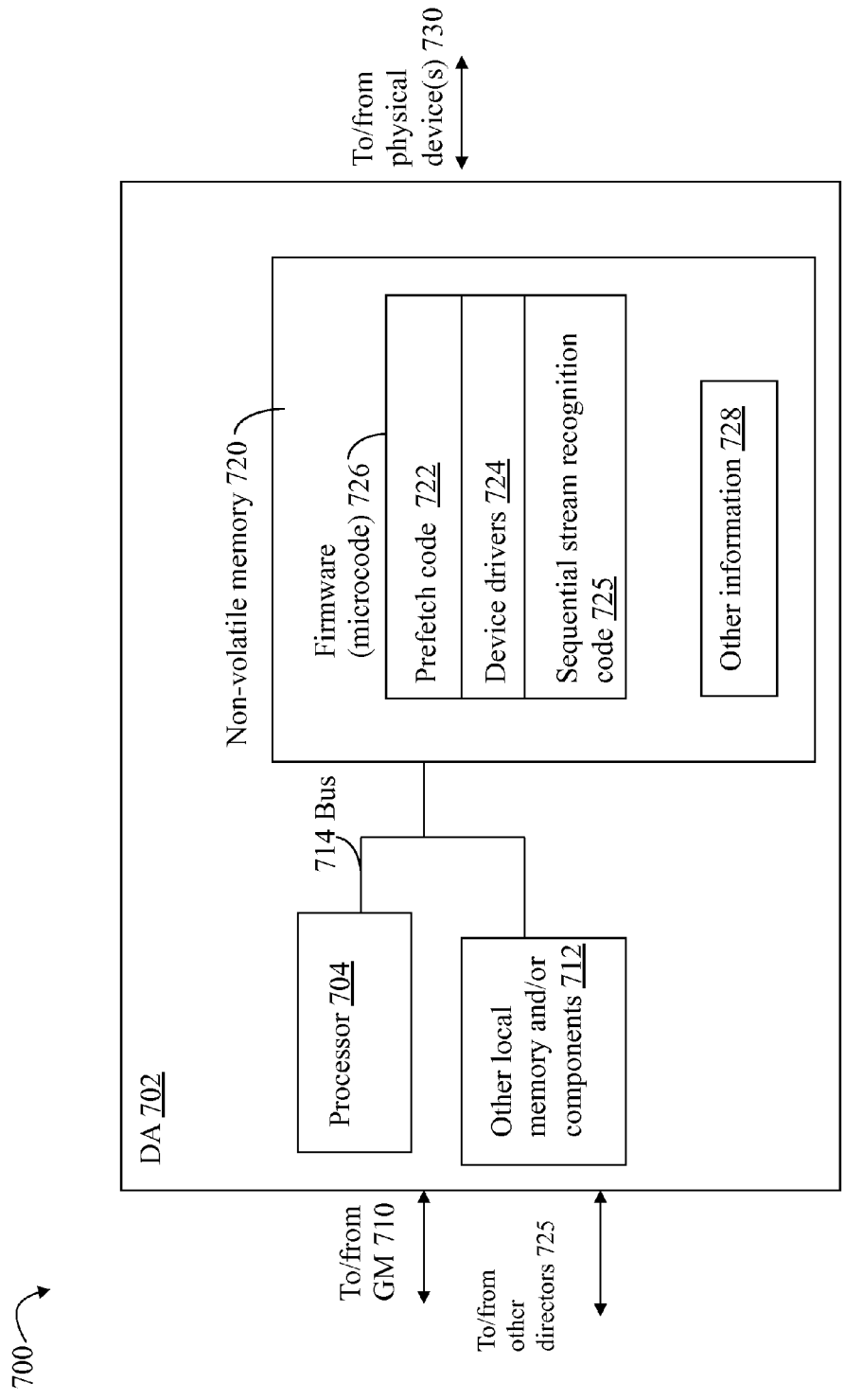
FIG. 9 is an example of components that may be included in a disk adapter (DA) in an embodiment in accordance with techniques herein.

Referring to FIG. 9, shown is an example illustrating a DA in more detail as may be included in an embodiment using the techniques herein. The example 700 illustrates a DA 702 including a processor 704, non-volatile memory (NVM) 720 and other local memory and/or components 712 which communicate over an internal bus 714. The components included in 702 may be characterized as local to the DA 702. The DA 702 may communicate with the global memory (GM) as illustrated by 710, write/read data to/from the physical devices as illustrated by 730, and communicate with other directors as illustrated by 725. It should be noted an embodiment may include the CM 38 of FIG. 2B and use the CM 38 in connection with communicating with other directors. The NVM 720 may include microcode or firmware 726. The firmware 726 may include prefetch code 722, device drivers 724, sequential stream recognition code 725, and other code used by the DA. The prefetch code 722 may include code for performing the prefetch processing described herein by the DA. The sequential stream recognition code 725 may include code for recognizing a sequential stream of consecutive read requests for data stored at consecutive contiguous physical locations as described herein by the DA. The NVM 720 may also include other information 728, such as code and/or data used by the DA.

It will be appreciated by those skilled in the art that other advantages and benefits may be obtained in an embodiment which has a physical device configuration other than a RAID-1 configuration and which also arranges data on data devices as described in connection with FIG. 7C. For example, consider an embodiment in which the PDs are arranged in a RAID group configuration such as RAID-5 or RAID-6 with storage provisioned therefrom for one or more LUNs which are data devices. In this case, the storage provisioned for consecutive or contiguous LBAs of a data device LUN may be striped across different PDs of the RAID group. Processing may be performed as described herein to detect and recognize a sequential stream of read requests for data stored at consecutive data device LBAs, such as of LUN A 410 or LUN B 420 of FIG. 7C. With the RAID-5 or RAID-6 configuration, the data will not have the same physical arrangement as with RAID-1 whereby the contiguous LBAs of the data device have their data also stored physically contiguous on the same PD. However, the mapping of a LUN's LBA (e.g., data device LBA) to its physical location is performed based on a mapping process. In this manner, an embodiment may recognize a sequential stream of read requests for data stored at consecutive data device LBAs, such as of LUN A 410 or LUN B 420 of FIG. 7C, and processing may be performed to predict physical locations of subsequent read requests of the detected pattern based on the particular data device to PD mapping that may vary with the particular RAID group configuration. Prefetch requests may be issued for the predicted physical location based on the detected sequential stream of read requests for data stored at consecutive data device LBAs, whereby the predicted physical location may be based on the particular data device (e.g., LUN) to physical device mapping for the selected RAID group configuration. In this manner, multiple DAs may be notified to prefetch data if such DAs each service read requests for a PD containing data predicted to be subsequently requested next.

Figure 9B:
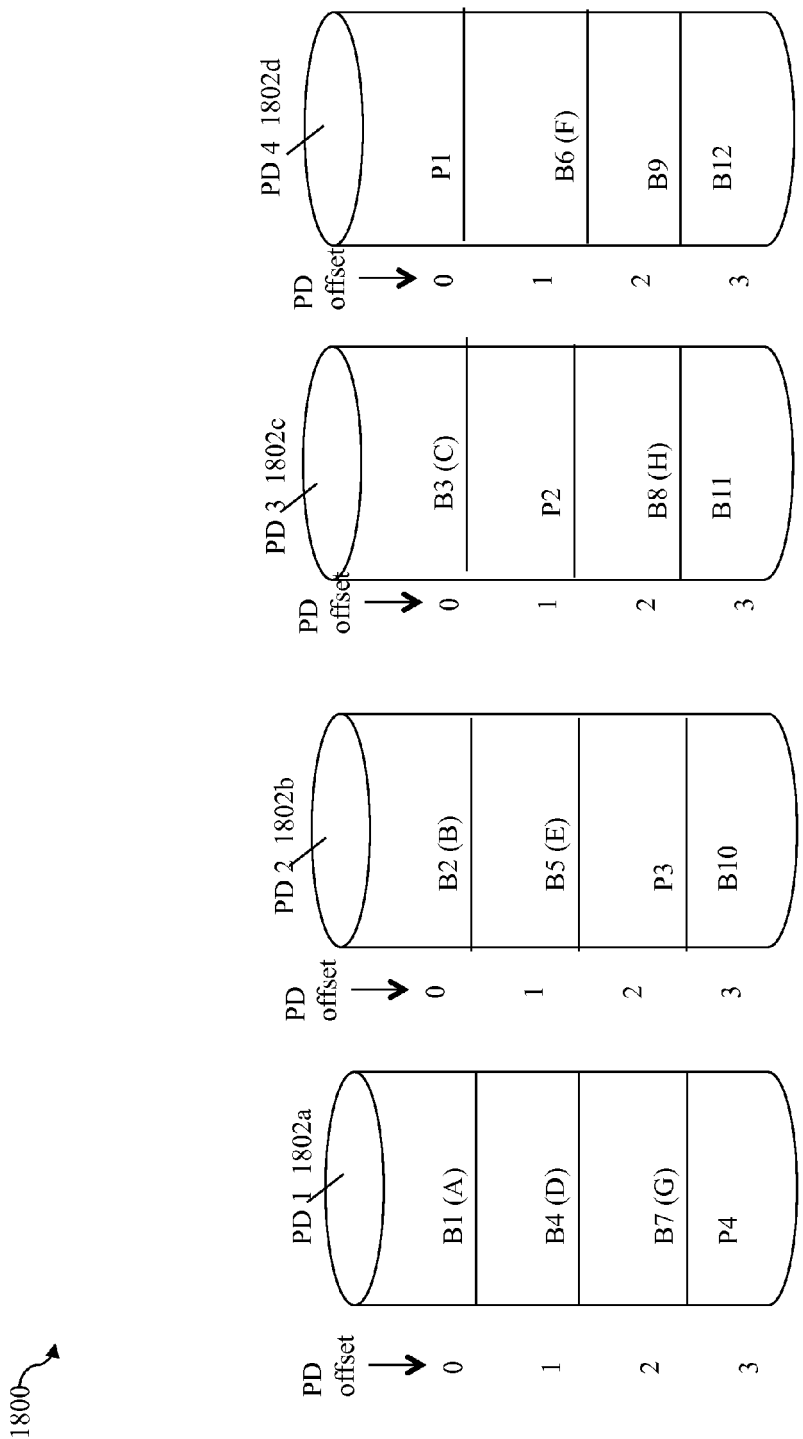
FIG. 9B is an example illustrating a data device to physical device mapping that may be used in an embodiment in accordance with techniques herein.

To further illustrate, reference is made to FIG. 9B with an example of a RAID-5 3×1 configuration (3 data drives and 1 parity) with block level striping and distributed parity. The example 1800 includes a 3×1 RAID-5 configuration with 4 PDs 1802*a-d*. Data blocks are striped in rows across the 4 PDs whereby each row includes data of 3 blocks striped across 3 PDs with the $4^{th}$ PD including parity information for the 3 blocks of the same row. The PDs 1802*a-d* may include blocks of user data, denoted by Bi, "i">0, for a single block of data, and may also include parity information, denoted by Pi, "i">0. Each row striped across the 4 PDs 1802*a-e* include 3 data blocks and a single set of parity information for the 3 data blocks in the row. The example 1800 illustrates where the different user data "A-H" may be stored in a RAID-5 configuration as opposed to a RAID 1 configuration as in FIG. 7C. It should be noted that PD offsets increment by 1 for each block in a manner consistent with other figures herein to denote a number of blocks. In this manner, the following table may denote the data device logical address to PD location mapping as illustrated by FIG. 9B:

| Data Device | LBA | Host file data stored | PD offset/location |
|---|---|---|---|
| LUN A | 0 | A | PD1, offset 0 |
| LUN A | 1 | B | PD2, offset 0 |
| LUN A | 2 | C | PD3, offset 0 |
| LUN A | 3 | D | PD1, offset 1 |
| LUN B | 0 | E | PD1, offset 4 |
| LUN B | 1 | F | PD1, offset 5 |
| LUN B | 2 | G | PD1, offset 6 |
| LUN B | 3 | H | PD1, offset 7 |

If a sequential stream of consecutive data device LBAs is detected, DAs may be notified to prefetch data based on the PD locations such as illustrated in FIG. 9B. For example, assume 3 read requests have been made to read LBAs 1-3 of the data device, wherein LBA 1 has data stored on PD1, PD offset 0, LBA 2 has data stored on PD 2, offset 0 and LBA 3 has data stored on PD 3, offset 0. A first prefetch request may be issued to prefetch data for LBA 4 stored on PD1, offset 1 and a second prefetch request may be issued to prefetch data for LBA 5 stored on PD 2, offset 1. Thus, prefetch requests may be determined based on the data device location to physical device location mapping such as illustrated in FIG. 9B.

What will now be described are flowcharts summarizing processing described above that may be performed in an embodiment in accordance with techniques herein.

Figure 10:
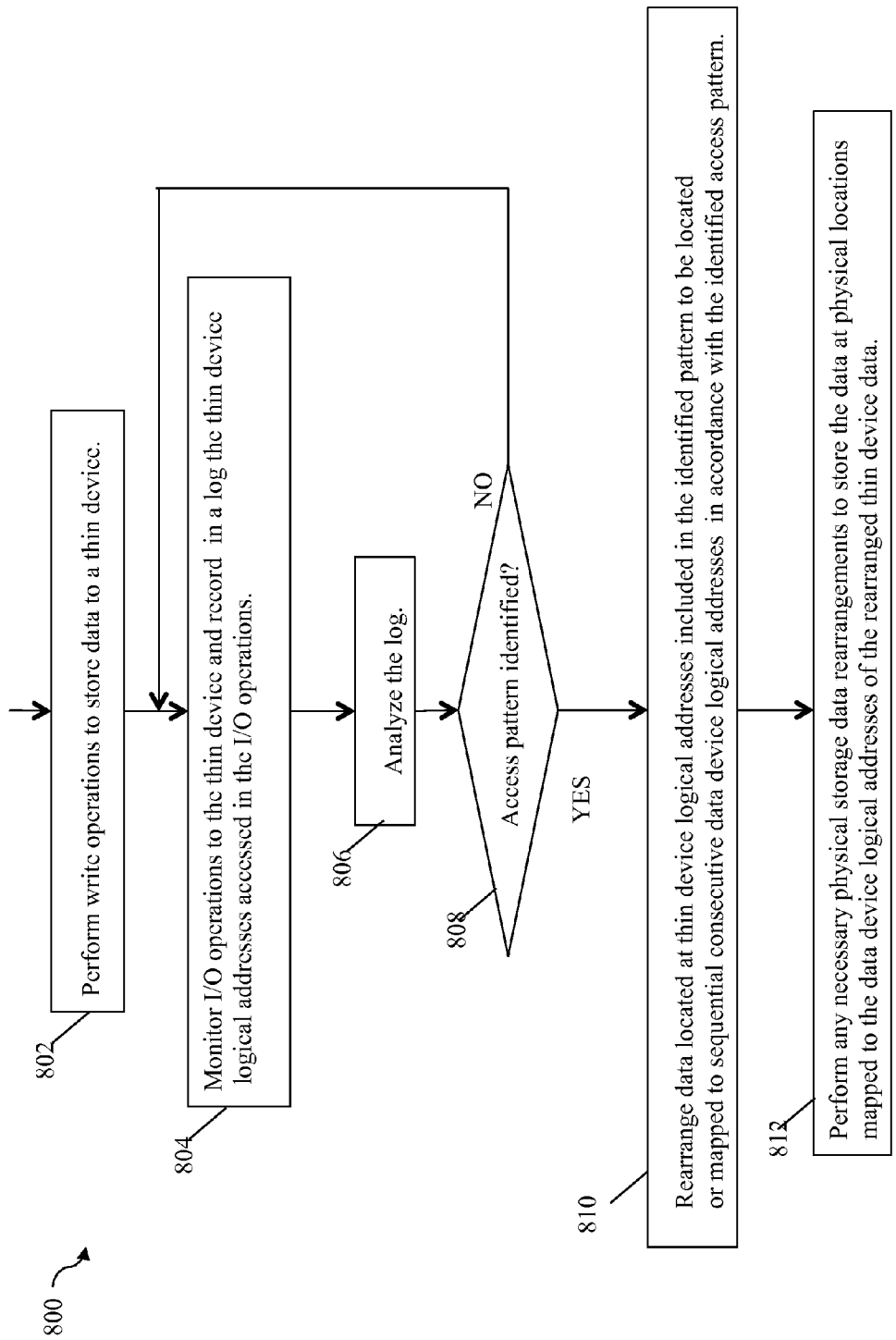
Figure 11:
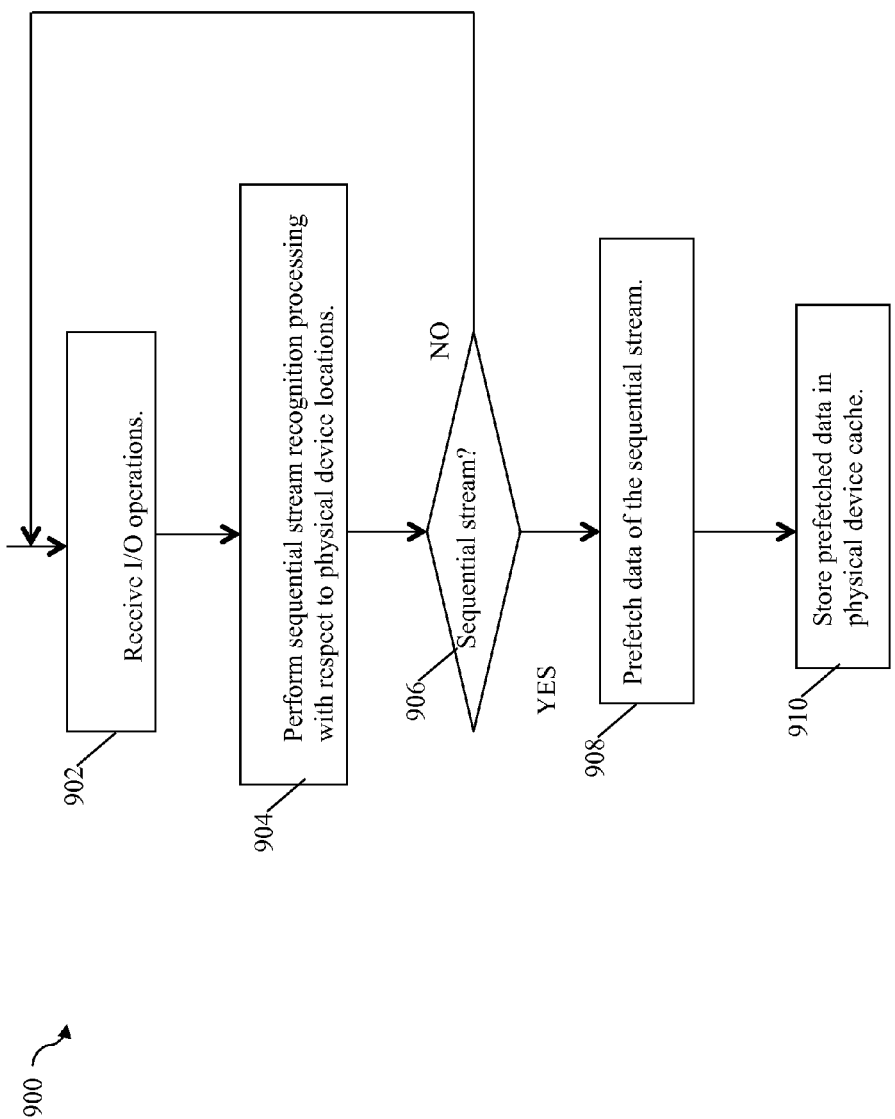

Referring to FIG. 10, shown is a first flowchart 800 of processing steps that may be performed in an embodiment in accordance with techniques herein. At step 802, write operations may be performed to stored data to a logical device, such as a thin device. At step 804, subsequent I/O operations to the thin device may be monitored. The thin device logical addresses accessed in the I/O operations may be recorded in a log. At step 806, the log may be analyzed to detect a recurring access pattern. At step 808, a determination is made as to whether a recurring access pattern has been identified in the recorded data of the log. If step 808 evaluates to no, control proceeds to step 804 to continue to monitor and record information about subsequent I/O operations. If step 808 evaluates to yes, control proceeds to step 810 to rearrange the data located at thin device logical addresses included in the identified pattern to be located or mapped to sequential consecutive data device logical addresses in accordance with the identified access pattern. At step 812, any necessary physical storage rearrangements may be performed to store the data at physical locations mapped to the data device logical addresses of the rearranged thin device data. Steps 810 and 812 may include appropriately updating any thin device logical address to data device logical address mappings and also appropriately updating any data device logical address to physical device location mappings Referring to FIG. 11, shown is a second flowchart of processing steps that may be performed in an embodiment in accordance with techniques herein. The steps of 900 may be performed subsequent to performing the steps of flowchart 800. The steps of 900 generally describe logical processing that may be performed in connection with sequential stream recognition with respect to physical device locations and prefetching such as by code of a physical device. At step 902, I/O operations may be received at the data storage system resulting in issuing one or more requests to read and/or write data to the DA. In turn, the DA read data from, or writes data to, the physical storage device depending on the particular I/O operation. At step 904, code stored in memory included as a component of the physical storage device may be executed. Such code may perform sequential stream recognition processing with respect to read operations reading data from consecutive physical device locations. At step 906, it is determined whether I/O operations received are a sequential stream of read operations reading data from consecutive physical storage locations. If step 906 evaluates to no, control proceeds to step 902. If step 906 evaluates to yes, control proceeds to step 908 to prefetch additional data of the sequential stream. At step 910, the prefetched data is stored in the cache included as a component of the physical device.

Referring to FIG. 12, shown is a third flowchart of processing steps that may be performed in an embodiment in accordance with techniques herein. The steps of 1000 may be performed subsequent to performing the steps of flowchart 800. The steps of 1000 generally describe logical processing that may be performed in connection with sequential stream recognition with respect to data device logical addresses and prefetching such as by code of a DA. At step 1002, I/O operations may be received at the data storage system resulting in issuing one or more requests to read and/or write data to the DA. In turn, the DA read data from, or writes data to, the physical storage device depending on the particular I/O operation. At step 1004, code stored in memory included as a component of the DA may be executed. Such code may perform sequential stream recognition processing with respect to read operations reading data from consecutive logical addresses of a data device. At step 1006, it is determined whether I/O operations received are a sequential stream of read operations reading data from consecutive data device logical addresses. If step 1006 evaluates to no, control proceeds to step 1002. If step 1006 evaluates to yes, control proceeds to step 1008 to prefetch additional data of the sequential stream. At step 1010, the prefetched data may be stored in the cache of the data storage system.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of storing data comprising:
   identifying a data access pattern for accessing a first set of data portions of a first logical device, wherein the data access pattern includes a time-ordered list of consecutively accessed logical addresses of the first logical device;
   arranging the first set of data portions on a second logical device different from the first logical device, wherein, after said arranging, first corresponding logical addresses, denoting logical addresses of the first set of data portions on the first logical device, are mapped to second corresponding logical addresses on the second logical device, wherein the second corresponding logical addresses have a consecutive sequential ordering based on the data access pattern; and storing the first set of data portions at physical device locations mapped to the second corresponding logical addresses of the second logical device.

2. The method of claim 1, further comprising:
receiving an I/O operation directed to a first logical address of the first logical device;
determining a first physical storage location mapped to the first logical address of the first logical device by performing first processing comprising:
mapping the first logical address of the first logical device to a second logical address of the second logical device; and
mapping the second logical address of the second logical device to the first physical storage location.

3. The method of claim 1, further comprising:
monitoring received data operations directed to the first logical device;
recording in a log logical addresses of the first logical device accessed by said data operations; and
analyzing the log to determine the data access pattern.

4. The method of claim 3, wherein the time-ordered list of consecutively accessed logical addresses includes a plurality of logical addresses forming the data access pattern and wherein the time-ordered list does not form a sequence of contiguous logical addresses of the first logical device.

5. The method of claim 3, wherein the data operations include both read and write operations and an entry is made in the log for each of the data operations and wherein the data access pattern includes logical addresses of the first logical device accessed in connection with at least one read operation and at least one write operation.

6. The method of claim 1, wherein the physical device locations are located on a set of physical devices configured as a RAID group providing mirroring of stored data without parity and without striping, whereby all data stored to the set of physical devices is stored on two different physical devices of the set.

7. The method of claim 6, wherein, the set of physical devices includes a first physical device and a second physical device, and wherein, for two data portions in the first set having consecutive logical addresses on the second logical device, said two data portions are contiguously stored at consecutive physical locations of the first physical device and also stored at consecutive physical locations of the second physical device mirroring data stored on the first physical device.

8. The method of claim 7, further comprising:
performing sequential stream recognition processing to recognize a sequential stream of read operations accessing consecutive physical locations of a physical device of the set; and
responsive to recognizing a sequential stream of read operations, prefetching first data in accordance with the recognized sequential stream prior to said first data being requested in connection with a read operation.

9. The method of claim 8, wherein code stored in a memory of the physical device is executed and performs said sequential stream recognition processing and said prefetching, and wherein said prefetching prefetches said first data and stores the first data in a cache of the physical device.

10. The method of claim 1, further comprising:
performing sequential stream recognition processing to recognize a sequential stream of read operations accessing consecutive logical addresses of the second logical device; and
responsive to recognizing a sequential stream of read operations, prefetching first data in accordance with the recognized sequential stream prior to said first data being requested in connection with a read operation.

11. The method of claim 9, wherein code stored in a memory of a disk controller is executed and performs said sequential stream recognition processing and said prefetching, and wherein said prefetching prefetches said first data and stores the first data in a cache of a data storage system including the disk controller.

12. A non-transitory computer readable medium comprising code stored thereon that, when executed, performs a method for storing data comprising:
identifying a data access pattern for accessing a first set of data portions of a first logical device, wherein the data access pattern includes a time-ordered list of consecutively accessed logical addresses of the first logical device;
arranging the first set of data portions on a second logical device different from the first logical device, wherein, after said arranging, first corresponding logical addresses, denoting logical addresses of the first set of data portions on the first logical device, are mapped to second corresponding logical addresses on the second logical device, wherein the second corresponding logical addresses have a consecutive sequential ordering based on the data access pattern; and
storing the first set of data portions at physical device locations mapped to the second corresponding logical addresses of the second logical device.

13. The non-transitory computer readable medium of claim 12, wherein the method further comprises:
receiving an I/O operation directed to a first logical address of the first logical device;
determining a first physical storage location mapped to the first logical address of the first logical device by performing first processing comprising:
mapping the first logical address of the first logical device to a second logical address of the second logical device; and
mapping the second logical address of the second logical device to the first physical storage location.

14. The non-transitory computer readable medium of claim 12, wherein the method further comprises:
monitoring received data operations directed to the first logical device;
recording in a log logical addresses of the first logical device accessed by said data operations; and
analyzing the log to determine the data access pattern.

15. The non-transitory computer readable medium of claim 14, wherein the time-ordered list of consecutively accessed logical addresses includes a plurality of logical addresses forming the data access pattern and wherein the time-ordered list does not form a sequence of contiguous logical addresses of the first logical device.

16. The non-transitory computer readable medium of claim 14, wherein the data operations include both read and write operations and an entry is made in the log for each of the data operations and wherein the data access pattern includes logical addresses of the first logical device accessed in connection with at least one read operation and at least one write operation.

17. The non-transitory computer readable medium of claim 12, wherein the physical device locations are located on a set of physical devices configured as a RAID group providing mirroring of stored data without parity and without striping, whereby all data stored to the set of physical devices is stored on two different physical devices of the set.

18. The non-transitory computer readable medium of claim 17, wherein, the set of physical devices includes a first physical device and a second physical device, and wherein, for two data portions in the first set having consecutive logical addresses on the second logical device, said two data portions are contiguously stored at consecutive physical locations of the first physical device and also stored at consecutive physical locations of the second physical device mirroring data stored on the first physical device.

19. The non-transitory computer readable medium of claim 18, wherein the method further comprises:
performing sequential stream recognition processing to recognize a sequential stream of read operations accessing consecutive physical locations of a physical device of the set; and
responsive to recognizing a sequential stream of read operations, prefetching first data in accordance with the recognized sequential stream prior to said first data being requested in connection with a read operation, and wherein code stored in a memory of the physical device is executed and performs said sequential stream recognition processing and said prefetching, and wherein said prefetching prefetches said first data and stores the first data in a cache of the physical device.

20. A system comprising:
a host that issues I/O operations;
a data storage system including a plurality of physical devices, wherein the host issues the I/O operations to the data storage system, and wherein the data storage system includes a processor programmed to perform processing steps comprising:
monitoring received I/O operations and identifying a data access pattern for accessing a first set of data portions of a first logical device, wherein the data access pattern includes a time-ordered list of consecutively accessed logical addresses of the first logical device;
arranging the first set of data portions on a second logical device different from the first logical device, wherein, after said arranging, first corresponding logical addresses, denoting logical addresses of the first set of data portions on the first logical device, are mapped to second corresponding logical addresses on the second logical device, wherein the second corresponding logical addresses have a consecutive sequential ordering based on the data access pattern; and
storing the first set of data portions at physical device locations mapped to the second corresponding logical addresses of the second logical device.

\* \* \* \* \*